(12) United States Patent
Nakahara

(10) Patent No.: US 12,461,348 B2
(45) Date of Patent: Nov. 4, 2025

(54) ZOOM LENS AND IMAGE PICKUP APPARATUS HAVING THE SAME

(71) Applicant: CANON KABUSHIKI KAISHA, Tokyo (JP)

(72) Inventor: Makoto Nakahara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 18/347,616

(22) Filed: Jul. 6, 2023

(65) Prior Publication Data
US 2024/0045184 A1    Feb. 8, 2024

(30) Foreign Application Priority Data
Aug. 8, 2022    (JP) .................................. 2022-126694

(51) Int. Cl.
    G02B 15/14    (2006.01)
    G02B 15/16    (2006.01)
    G02B 27/64    (2006.01)

(52) U.S. Cl.
    CPC ........... G02B 15/143 (2019.08); G02B 15/16 (2013.01); G02B 27/646 (2013.01)

(58) Field of Classification Search
    CPC .... G02B 15/143; G02B 15/16; G02B 27/646; G02B 15/177
    USPC ....................................................... 359/689
    See application file for complete search history.

(56) References Cited

U.S. PATENT DOCUMENTS

| | | |
|---|---|---|
| 9,219,864 B2 | 12/2015 | Nakahara |
| 9,377,606 B2 | 6/2016 | Nakahara |
| 9,500,842 B2 | 11/2016 | Nakahara |
| 10,268,104 B2 | 4/2019 | Nakahara |
| 10,718,929 B2 | 7/2020 | Saito |
| 10,754,131 B2 | 8/2020 | Nakahara |
| 10,935,755 B2 | 3/2021 | Saito |
| 2010/0171849 A1* | 7/2010 | Tohchi ........... G02B 15/144113 359/687 |
| 2011/0149411 A1* | 6/2011 | Inoko ................. G02B 15/1465 359/680 |

(Continued)

FOREIGN PATENT DOCUMENTS

| | | |
|---|---|---|
| JP | 2017-122746 A | 7/2017 |
| JP | 2019-159046 A | 9/2019 |

(Continued)

OTHER PUBLICATIONS

Notice of Reasons for Refusal issued by the Japanese Patent Office on Jul. 30, 2024 in corresponding JP Patent Application No. 2022-126694, with English translation.

Primary Examiner — Mohammed A Hasan
(74) Attorney, Agent, or Firm — Carter, DeLuca & Farrell LLP

(57) ABSTRACT

A zoom lens includes, in order from an object side to an image side, a first lens unit having negative refractive power, a second lens unit having positive refractive power, and a rear group including one or more lens units. Distances between adjacent lens units change during zooming. The first lens unit includes, in order from the object side to the image side, three or more negative lenses. The second lens unit consists of a positive lens configured to move from the object side to the image side during focusing from infinity to a close distance. A predetermined condition is satisfied.

26 Claims, 13 Drawing Sheets

(56) References Cited

U.S. PATENT DOCUMENTS

| | | | |
|---|---|---|---|
| 2012/0307367 A1* | 12/2012 | Bito | G02B 15/145129 |
| | | | 359/557 |
| 2013/0038946 A1* | 2/2013 | Morooka | G02B 15/1461 |
| | | | 359/683 |
| 2018/0275382 A1* | 9/2018 | Sugita | G02B 13/02 |
| 2021/0033835 A1 | 2/2021 | Nakahara | |
| 2022/0214530 A1 | 7/2022 | Nakahara | |
| 2023/0213738 A1 | 7/2023 | Okuoka | |
| 2023/0213739 A1 | 7/2023 | Nakahara | |

FOREIGN PATENT DOCUMENTS

| | | |
|---|---|---|
| JP | 2019-191307 A | 10/2019 |
| JP | 2020-042221 A | 3/2020 |
| JP | 2020-134806 A | 8/2020 |

\* cited by examiner

ZOOM LENS AND IMAGE PICKUP APPARATUS HAVING THE SAME

BACKGROUND

Technical Field

One of the aspects of the embodiments relates to a zoom lens, and more particularly to a zoom lens suitable for an image pickup apparatus using a solid-state image sensor, such as a digital still camera, a video camera, a broadcasting camera, and a surveillance camera, and an image pickup apparatus, such as a film-based camera.

Description of Related Art

A zoom lens for an image pickup apparatus is demanded to have a wide angle of view, a small size, and good optical characteristics. One known type of zoom lens with a wide angle of view is a so-called negative lead type zoom lens in which a lens unit having negative refractive power is disposed closest to the object side.

Japanese Patent Laid-Open No. 2020-134806 discloses a zoom lens that includes, in order from the object side to the image side, a first lens unit having negative refractive power, a second lens unit having positive refractive power, a third lens unit having positive refractive power, a fourth lens unit having negative refractive power, and a fifth lens unit having positive refractive power.

Characteristically, the negative lead type zoom lenses can easily acquire a wider angle of view and a longer back focus. However, the negative lead type zoom lens tends to have an asymmetrical lens configuration with respect to the aperture stop. It is thus difficult to correct various aberrations; for example, it is difficult to suppress aberration fluctuations during focusing, and it is very difficult to obtain high optical performance.

In particular, aberration fluctuations tend to increase to increase during focusing in the inner focus type, in which focusing is performed by a small and lightweight lens unit disposed on the image side of the first lens unit for high-speed focusing.

The zoom lens disclosed in Japanese Patent Laid-Open No. 2020-134806 can suppress aberration fluctuations during focusing, but miniaturization of the focus lens unit is insufficient.

In order to achieve good optical performance with a reduced diameter of the focus lens unit, it is important to properly set the position of the focus lens unit and the power distribution of each lens unit.

SUMMARY

A zoom lens according to one aspect of the disclosure includes, in order from an object side to an image side, a first lens unit having negative refractive power, a second lens unit having positive refractive power, and a rear group including one or more lens units. Distances between adjacent lens units change during zooming. The first lens unit includes, in order from the object side to the image side, three or more negative lenses. The second lens unit consists of a positive lens configured to move from the object side to the image side during focusing from infinity to a close distance. The following inequalities are satisfied:

$$0.48 < D2w/TLw < 0.65$$

$$25 < vdGP < 45$$

where $TLw$ is an overall optical length of the zoom lens at a wide-angle end, $D2w$ is a distance on an optical axis from a lens surface closest to an object of the zoom lens at the wide-angle end to a lens surface closest to the object of the second lens unit, and $vdGP$ is an Abbe number based on d-line of the positive lens.

Further features of the disclosure will become apparent from the following description of embodiments with reference to the attached drawings.

DESCRIPTION OF THE EMBODIMENTS

Figure 1:
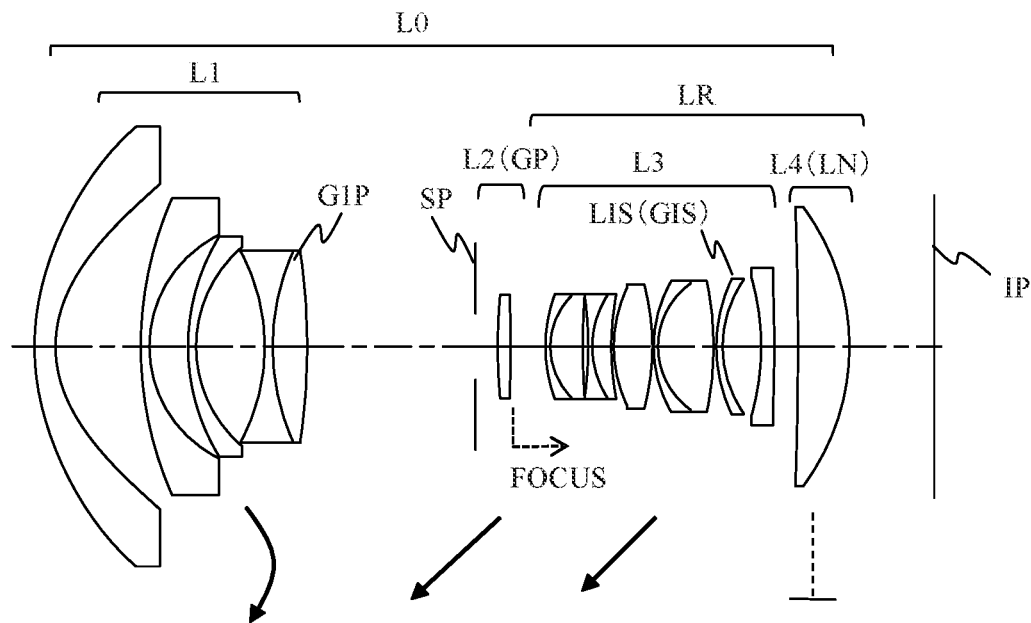
FIG. 1 is a sectional view of a zoom lens according to Example 1.
Figure 2A:
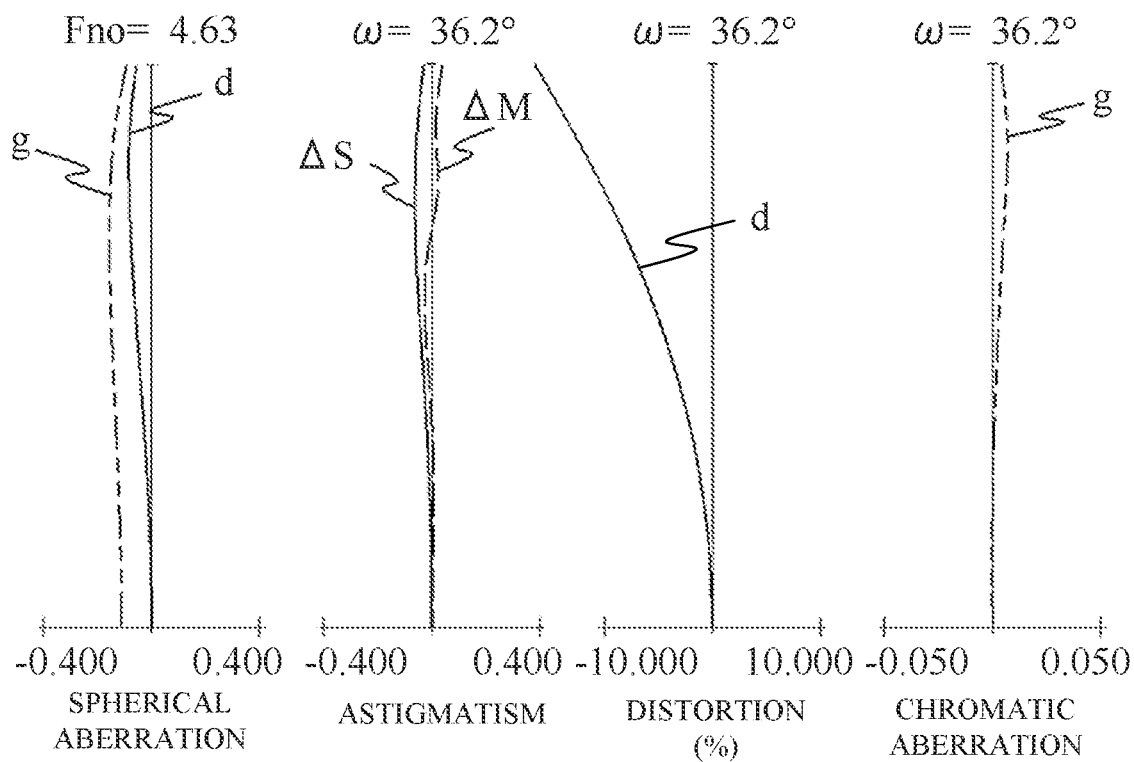
FIGS. 2A, 2B, and 2C are aberration diagrams of the zoom lens according to Example 1.
Figure 2B:
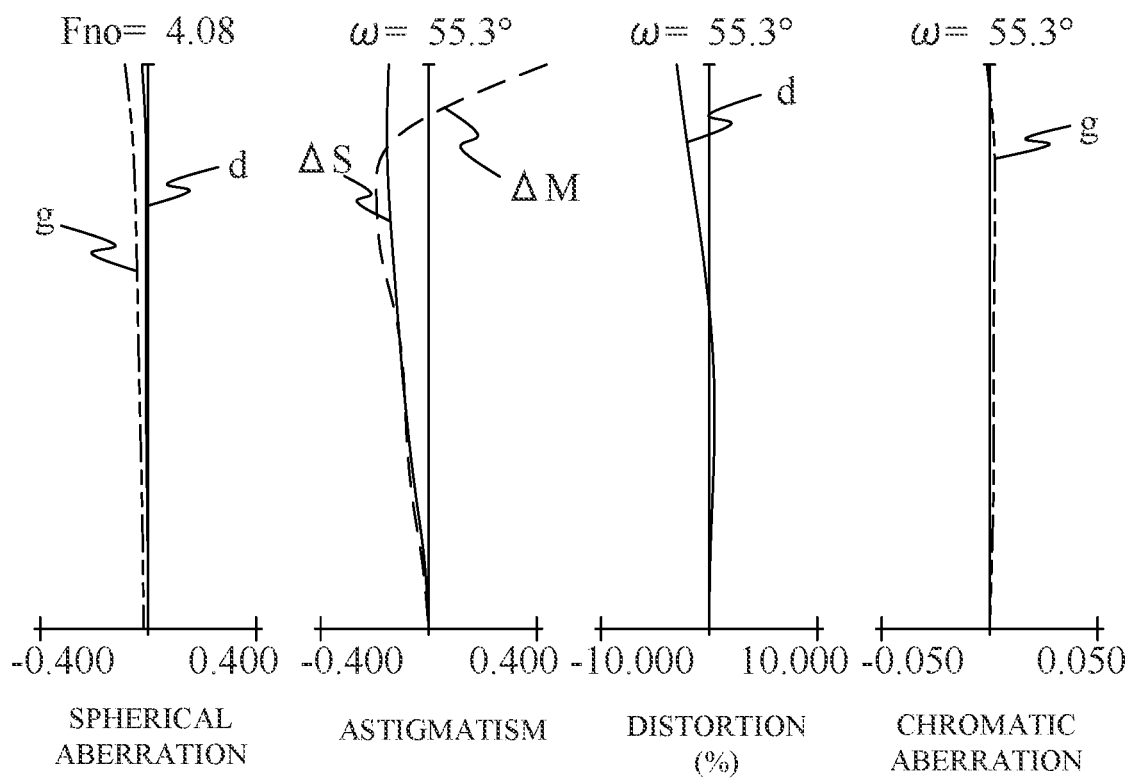
Figure 2C:
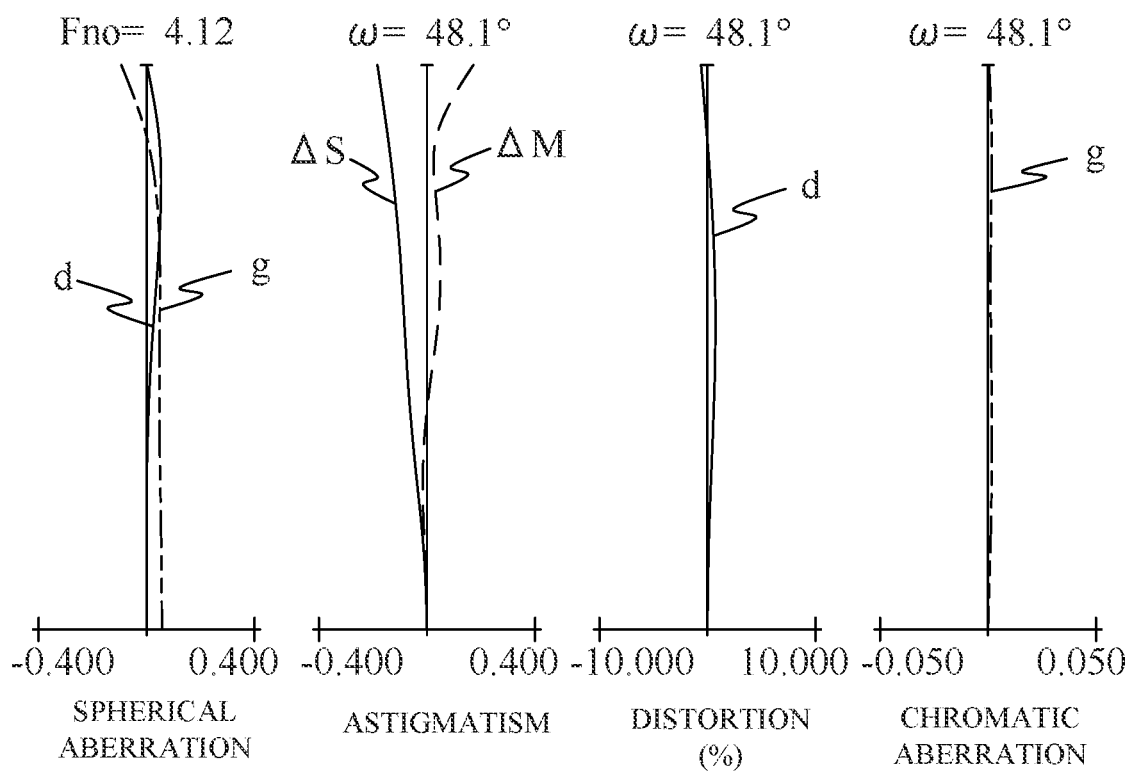
Figure 3:
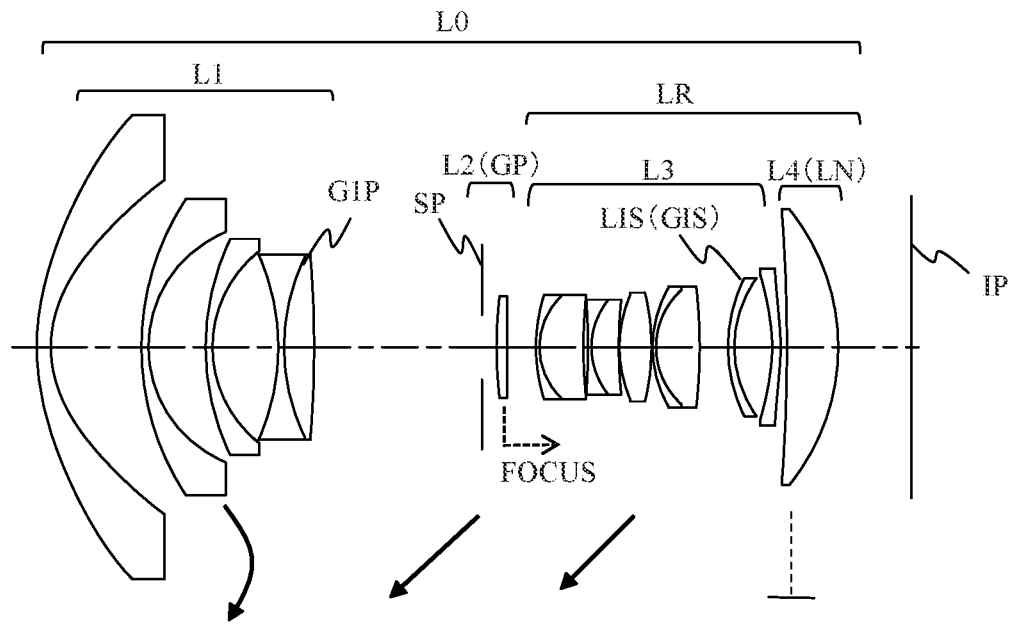
FIG. 3 is a sectional view of a zoom lens according to Example 2.
Figure 4A:
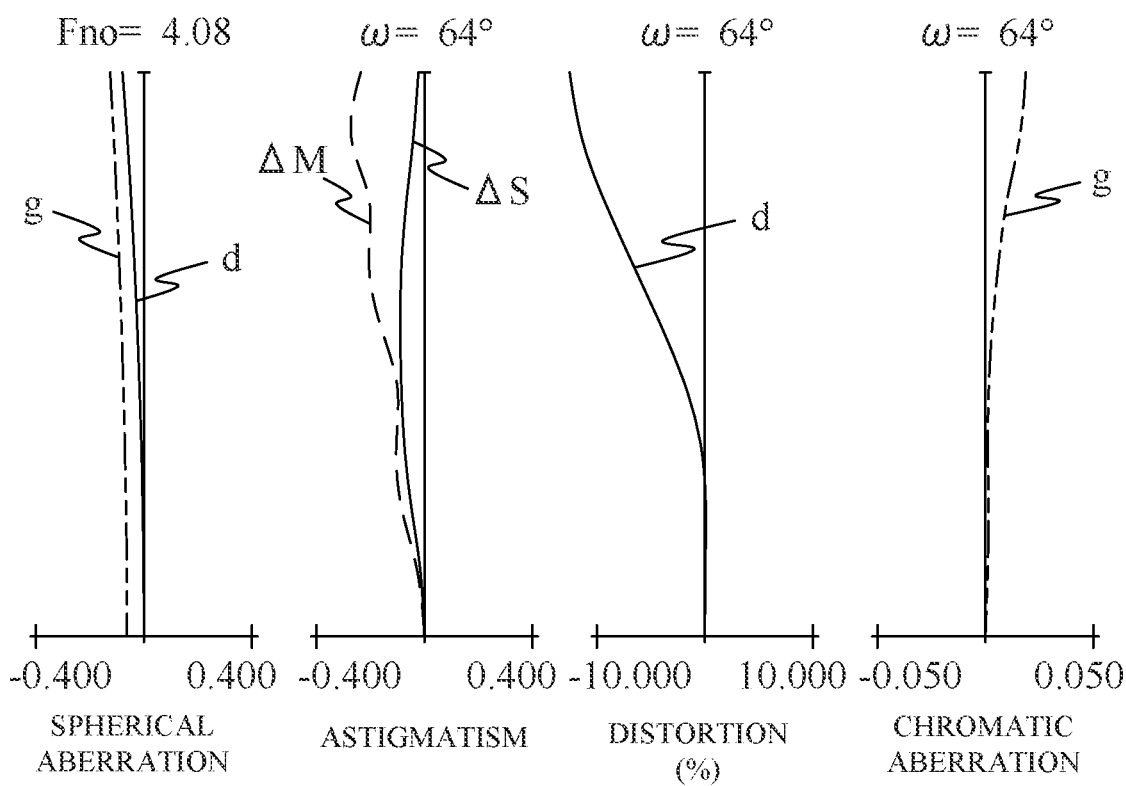
FIGS. 4A, 4B, and 4C are aberration diagrams of the zoom lens according to Example 2.
Figure 4B:
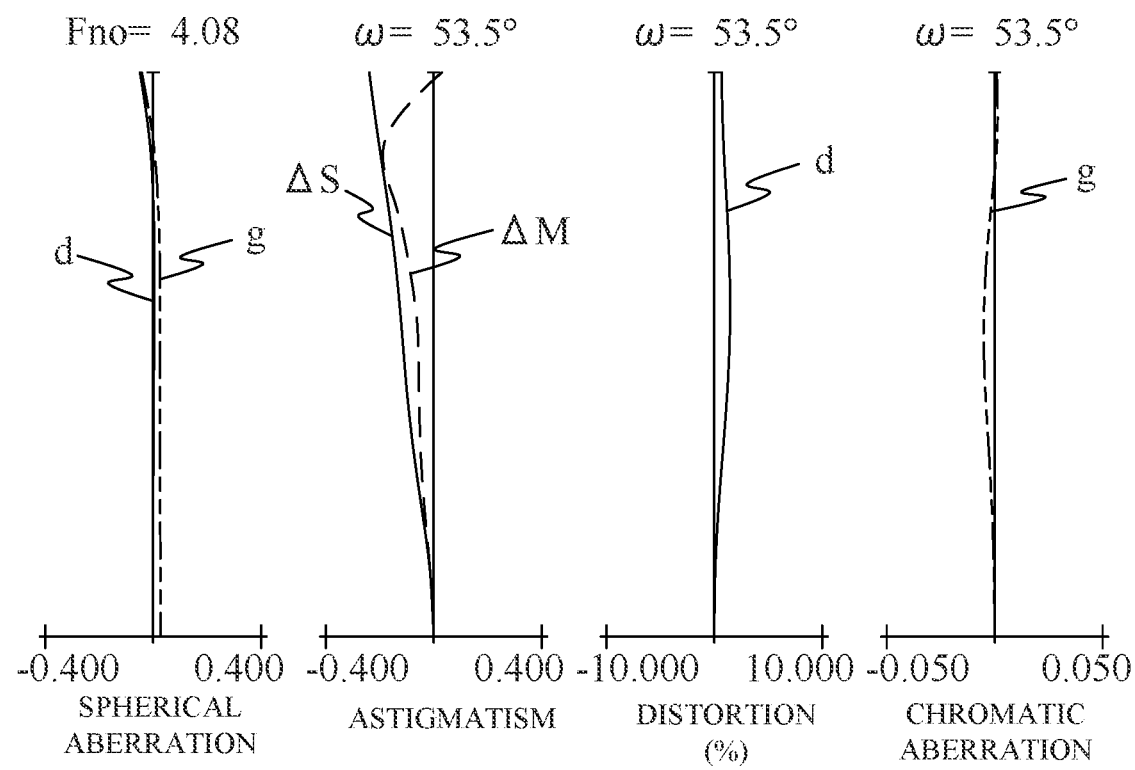
Figure 4C:
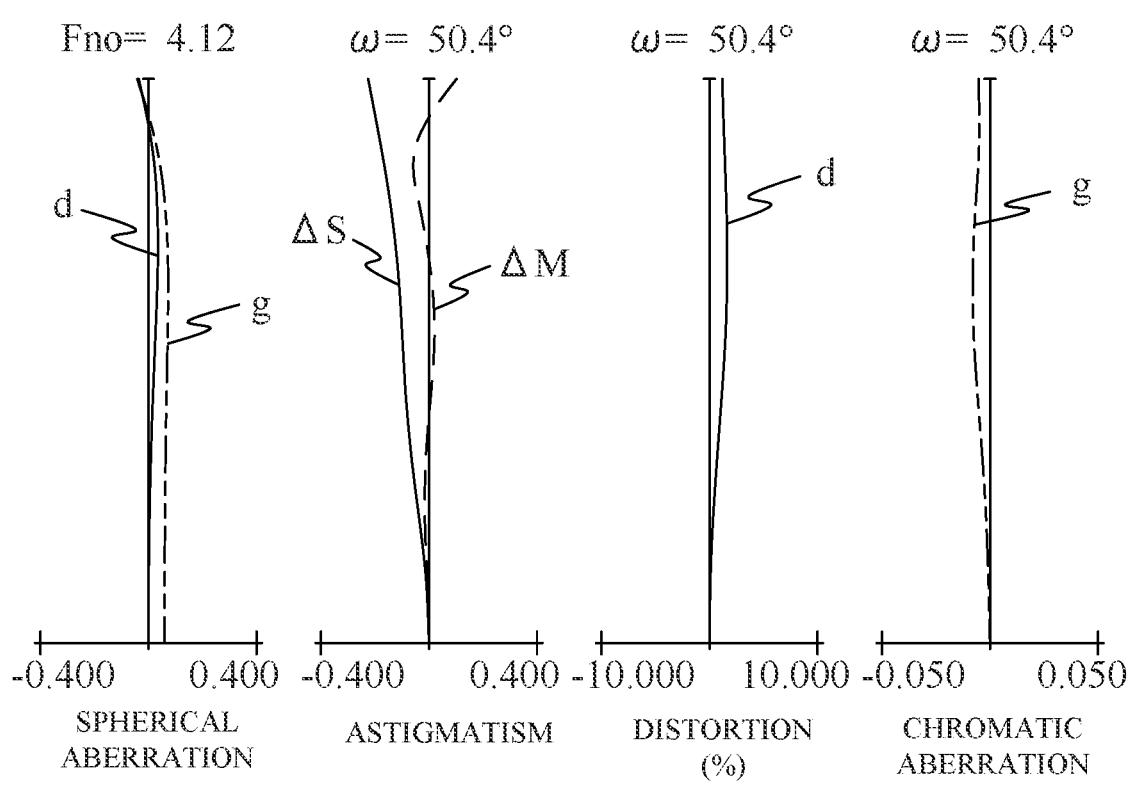
Figure 5:
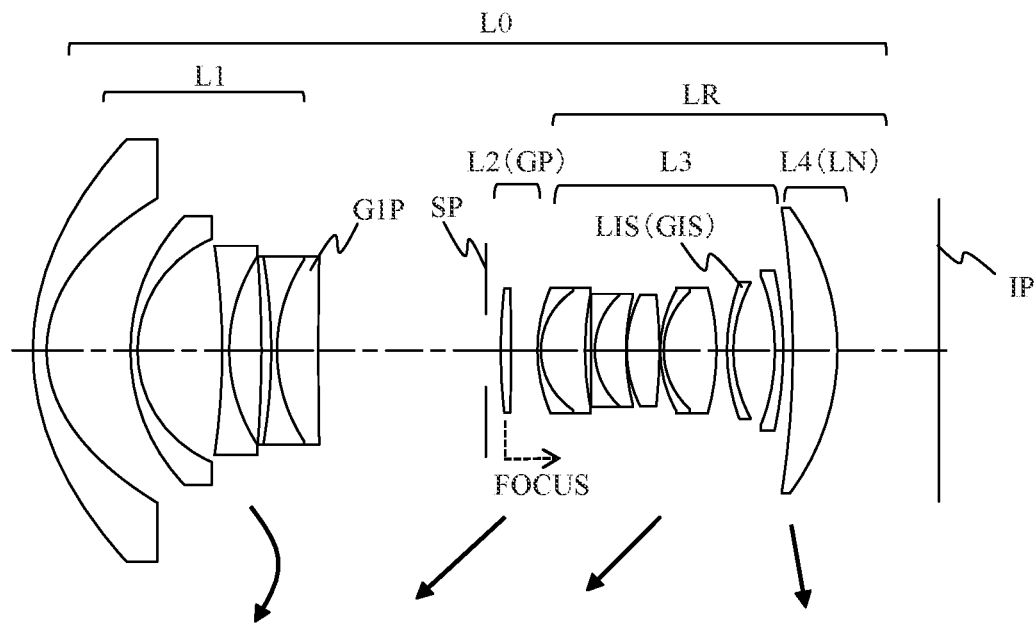
FIG. 5 is a sectional view of a zoom lens according to Example 3.
Figure 6A:
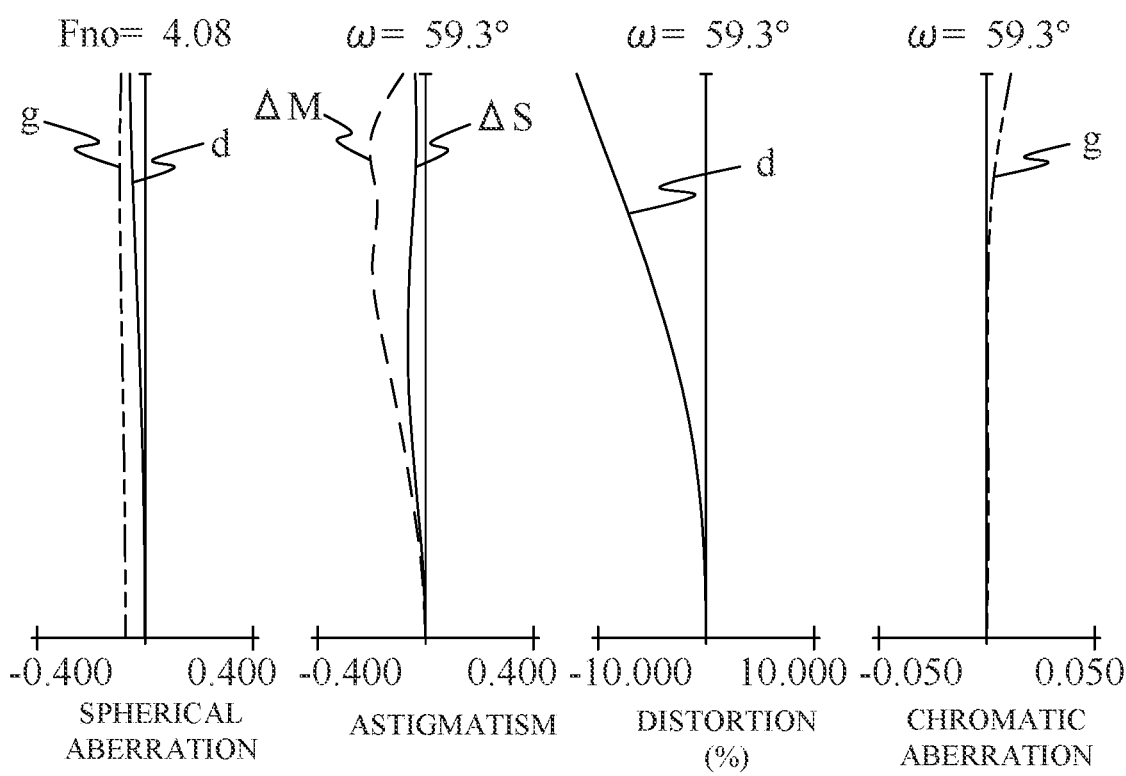
FIGS. 6A, 6B, and 6C are aberration diagrams of the zoom lens according to Example 3.
Figure 6B:
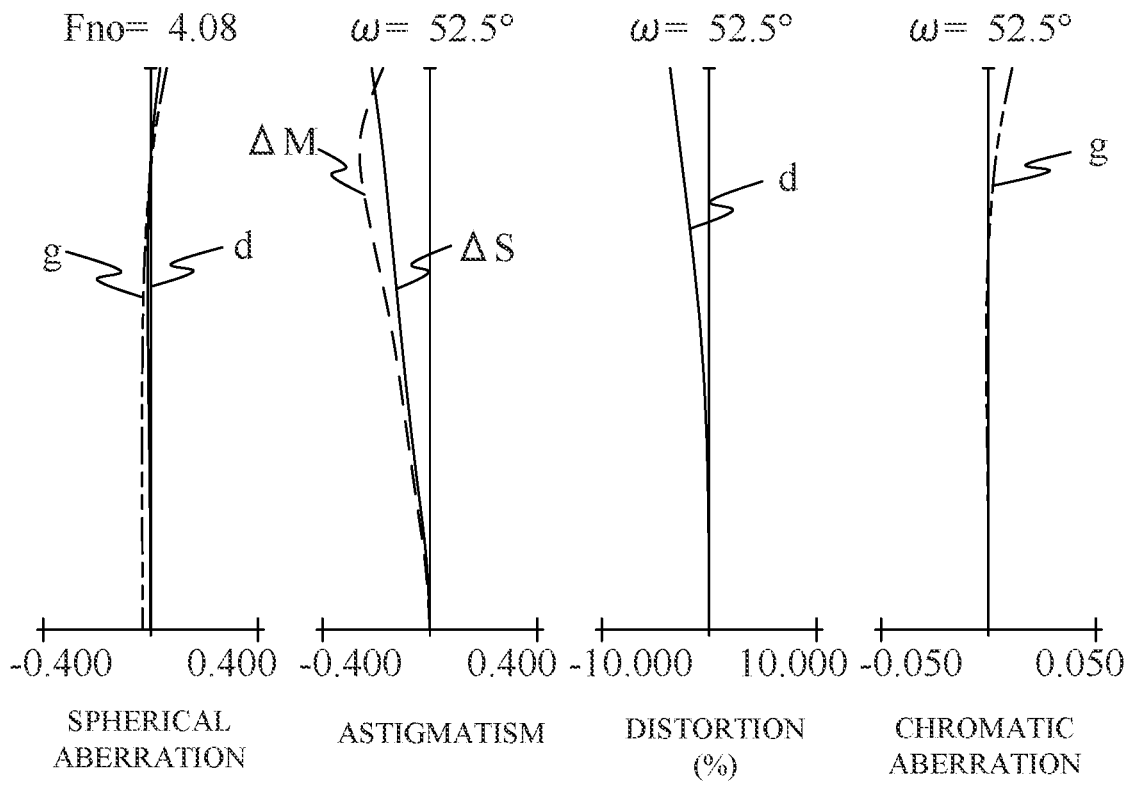
Figure 6C:
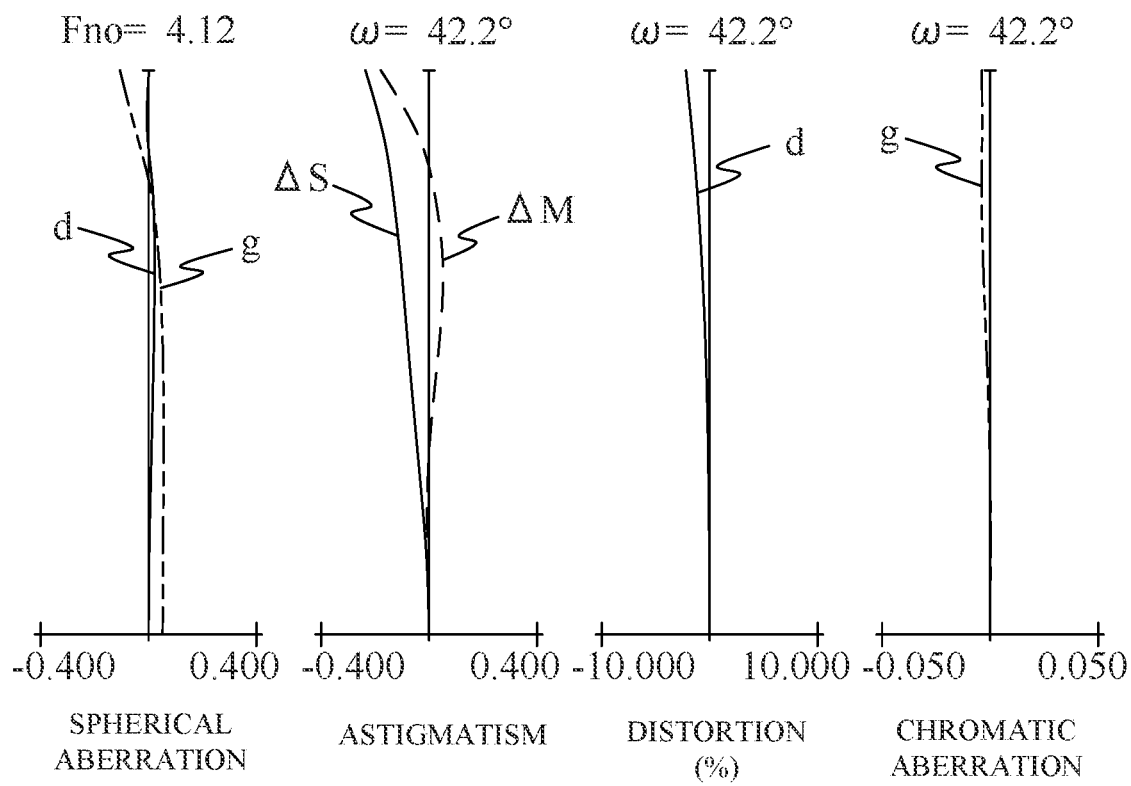
Figure 7:
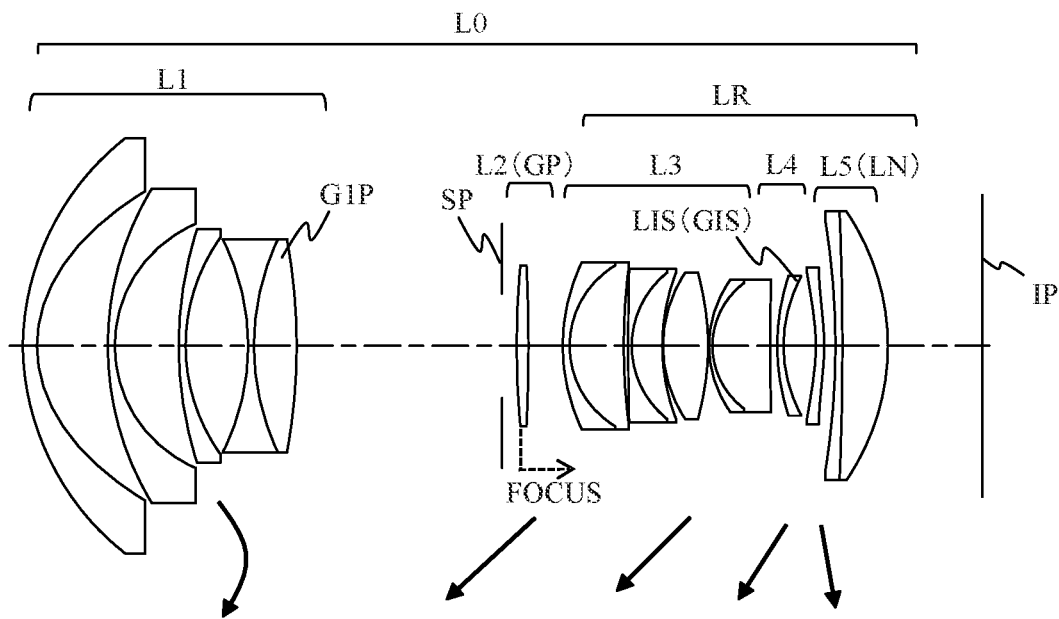
FIG. 7 is a sectional view of a zoom lens according to Example 4.
Figure 8A:
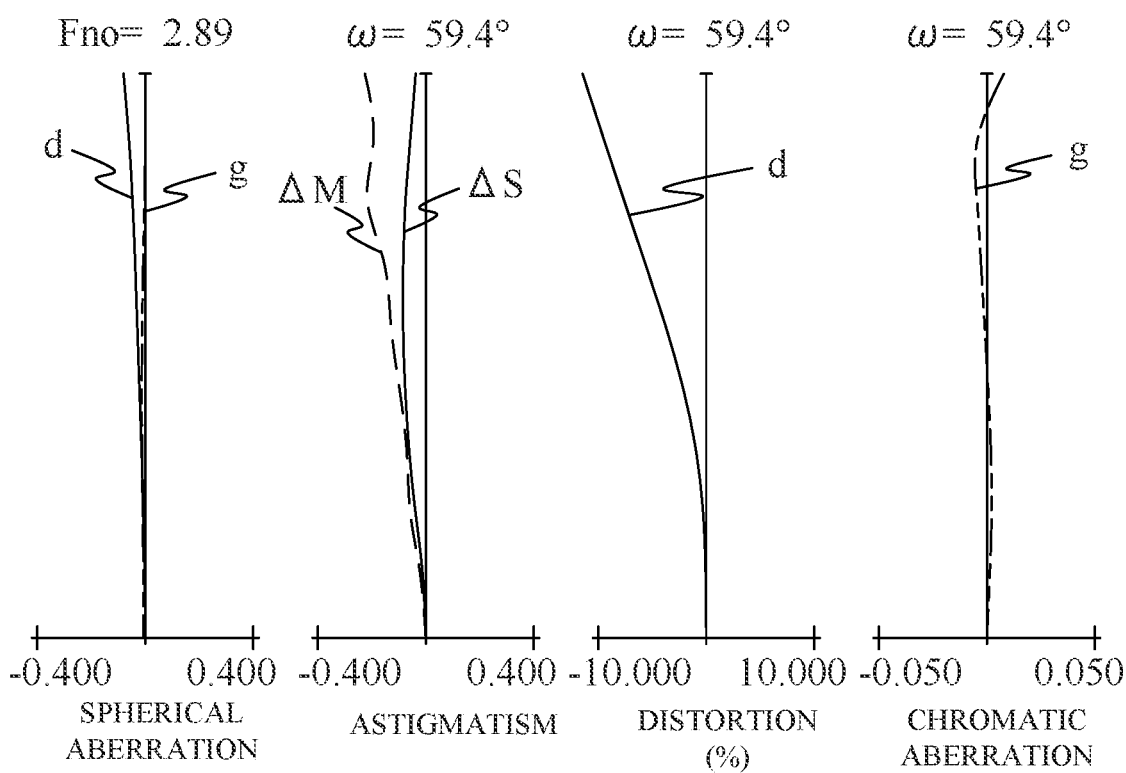
FIGS. 8A, 8B, and 8C are aberration diagrams of the zoom lens according to Example 4.
Figure 8B:
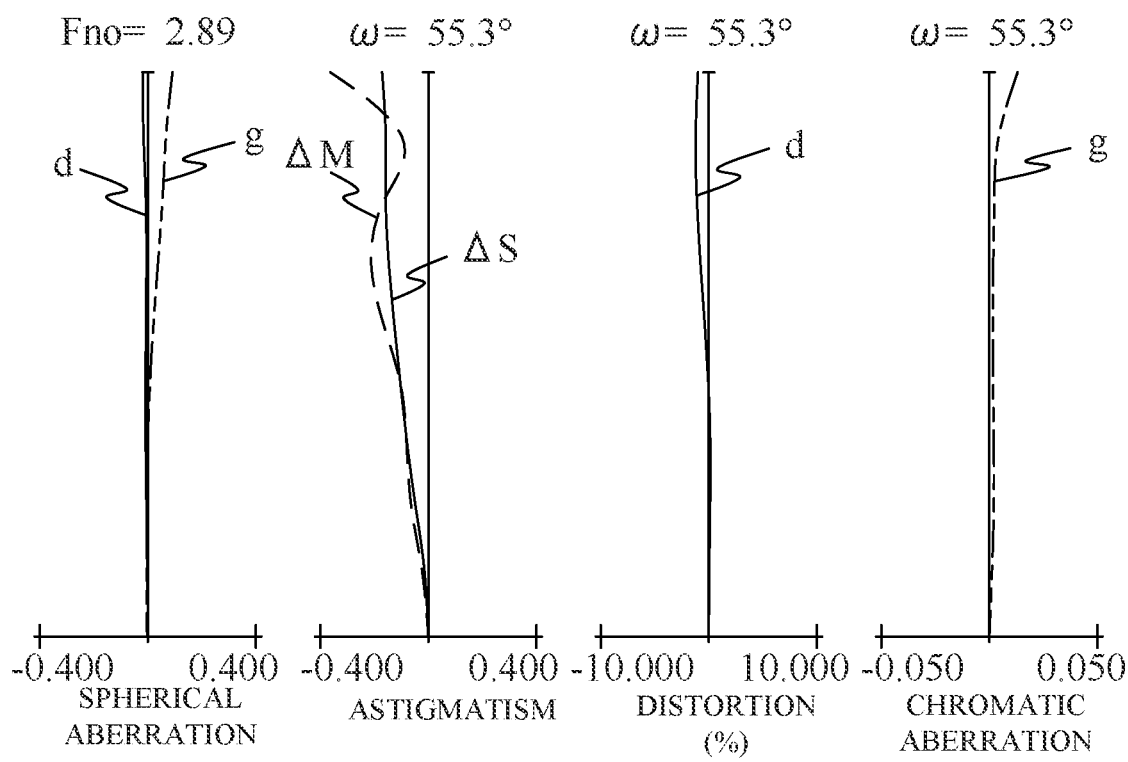
Figure 8C:
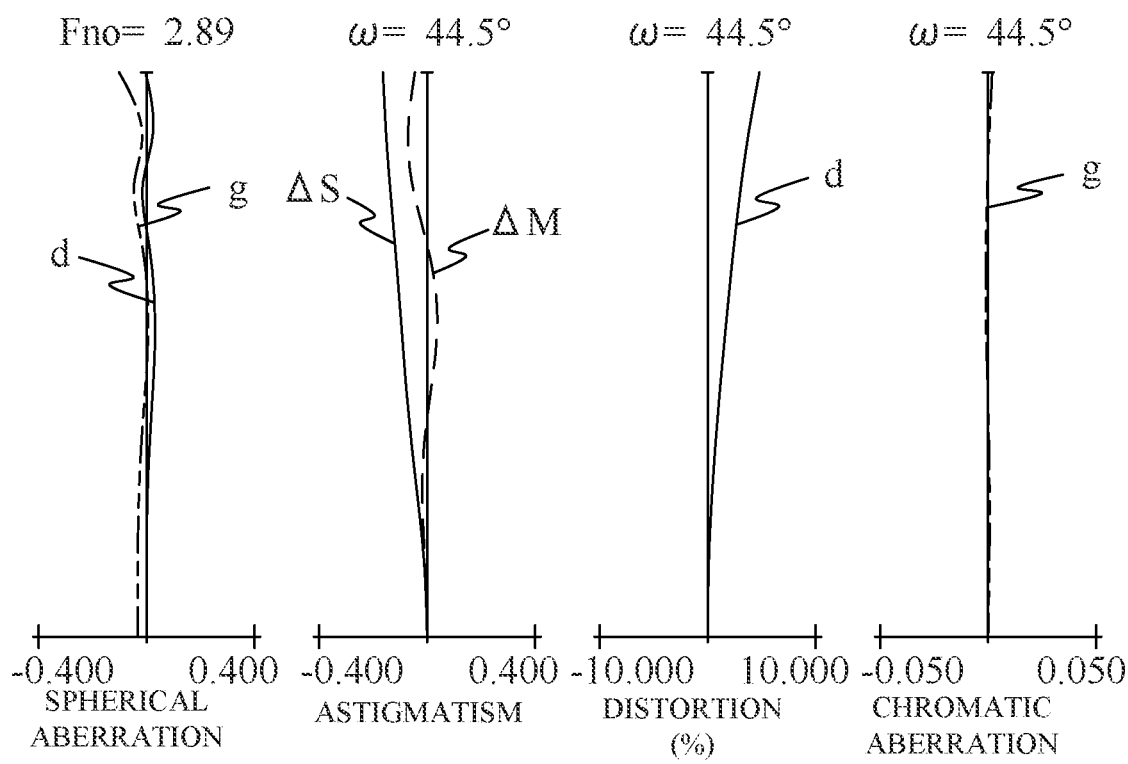
Figure 9:
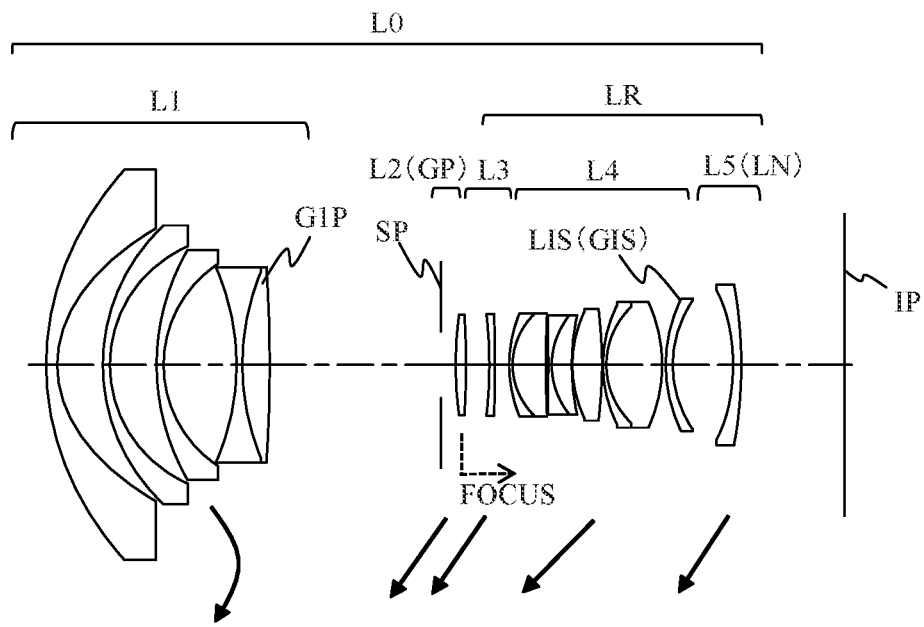
FIG. 9 is a sectional view of a zoom lens according to Example 5.
Figure 10A:
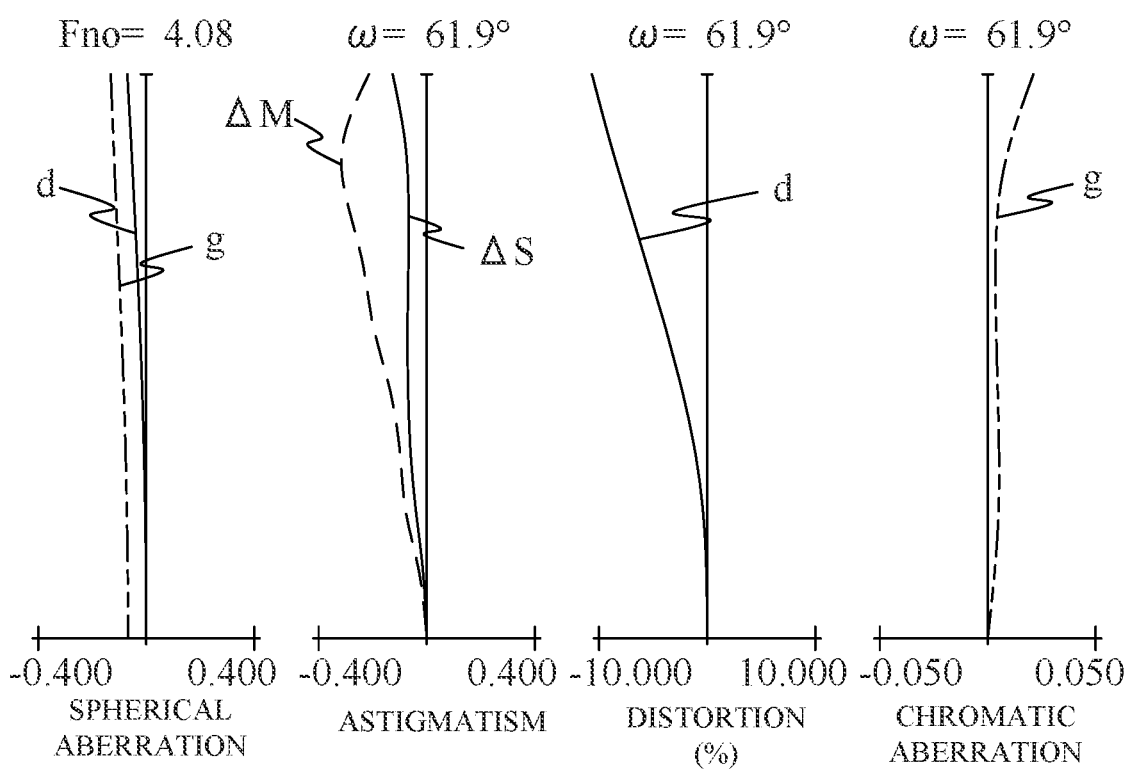
FIGS. 10A, 10B, and 10C are aberration diagrams of the zoom lens according to Example 5.
Figure 10B:
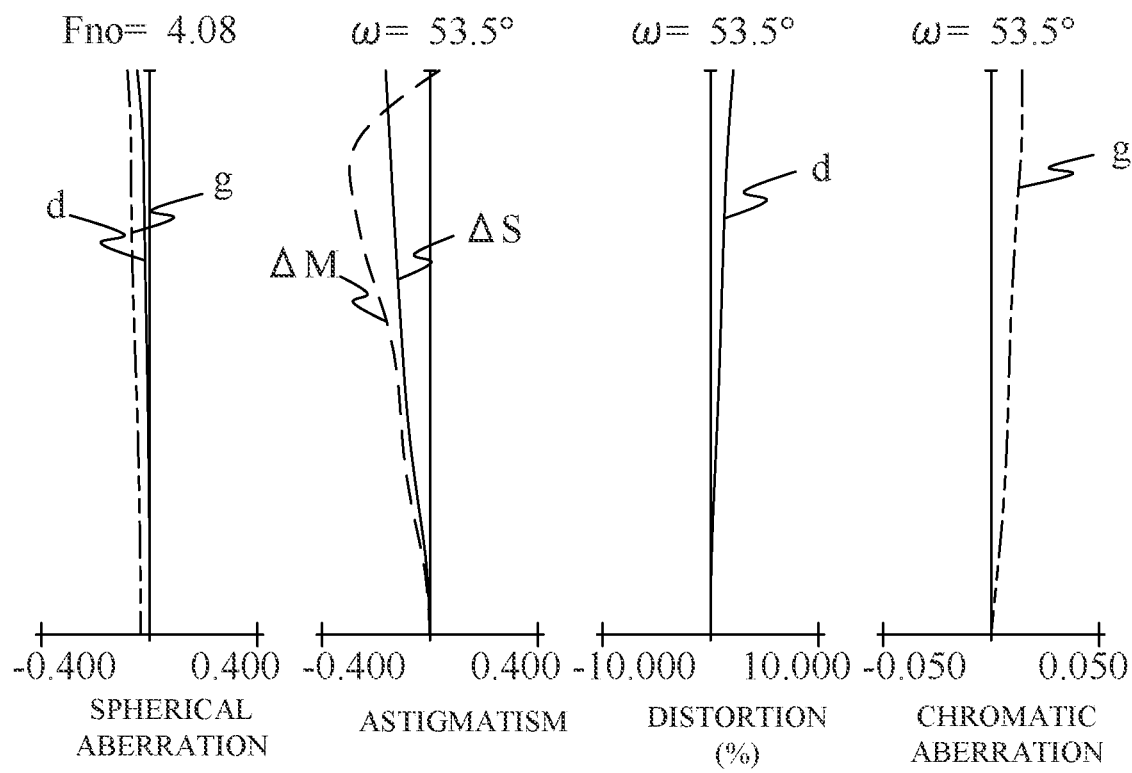
Figure 10C:
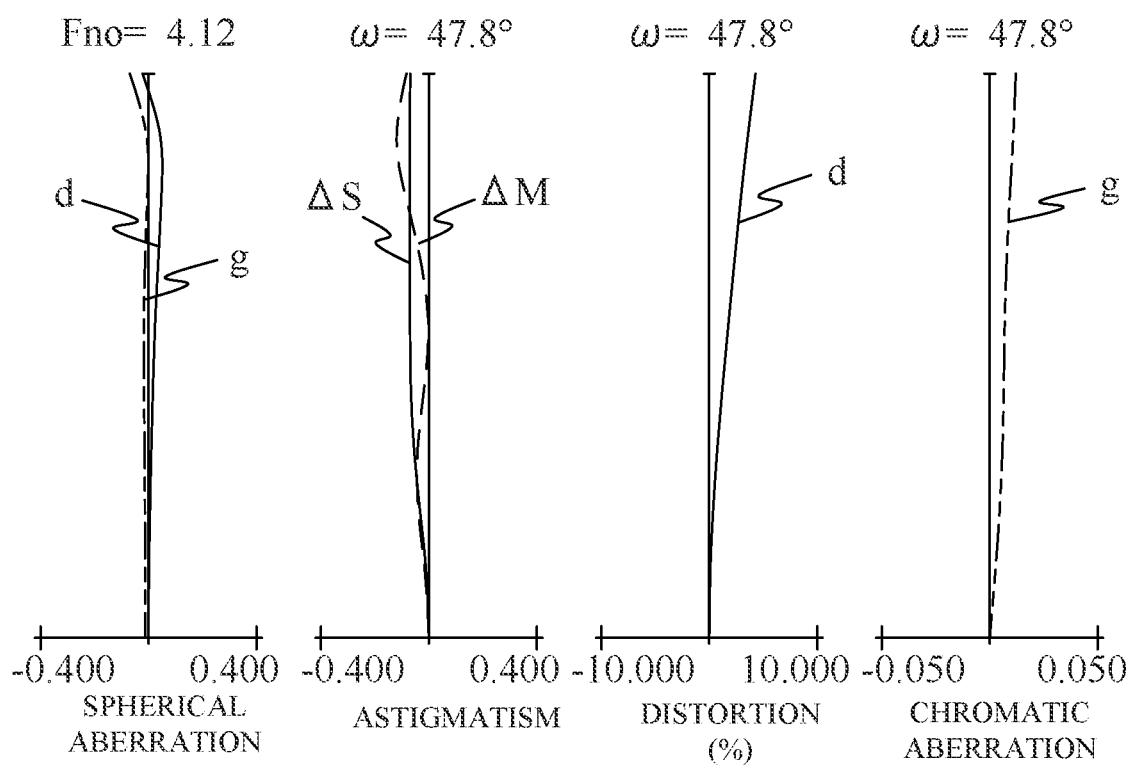
Figure 11:
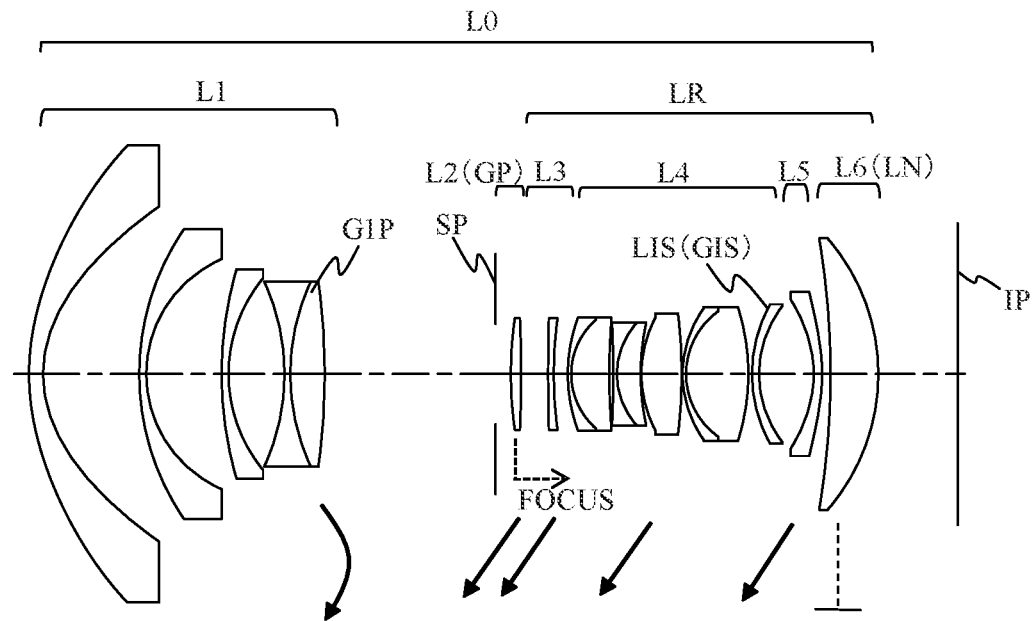
FIG. 11 is a sectional view of a zoom lens according to Example 6.
Figure 12A:
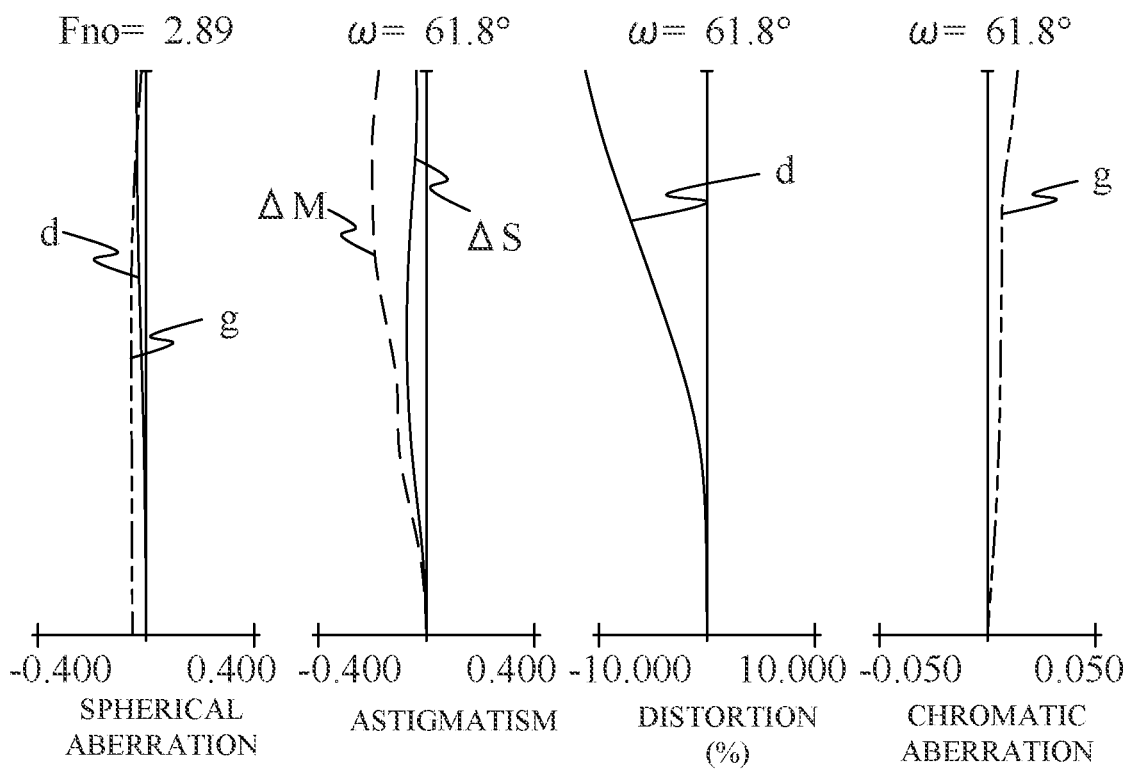
FIGS. 12A, 12B, and 12C are aberration diagrams of the zoom lens according to Example 6.
Figure 12B:
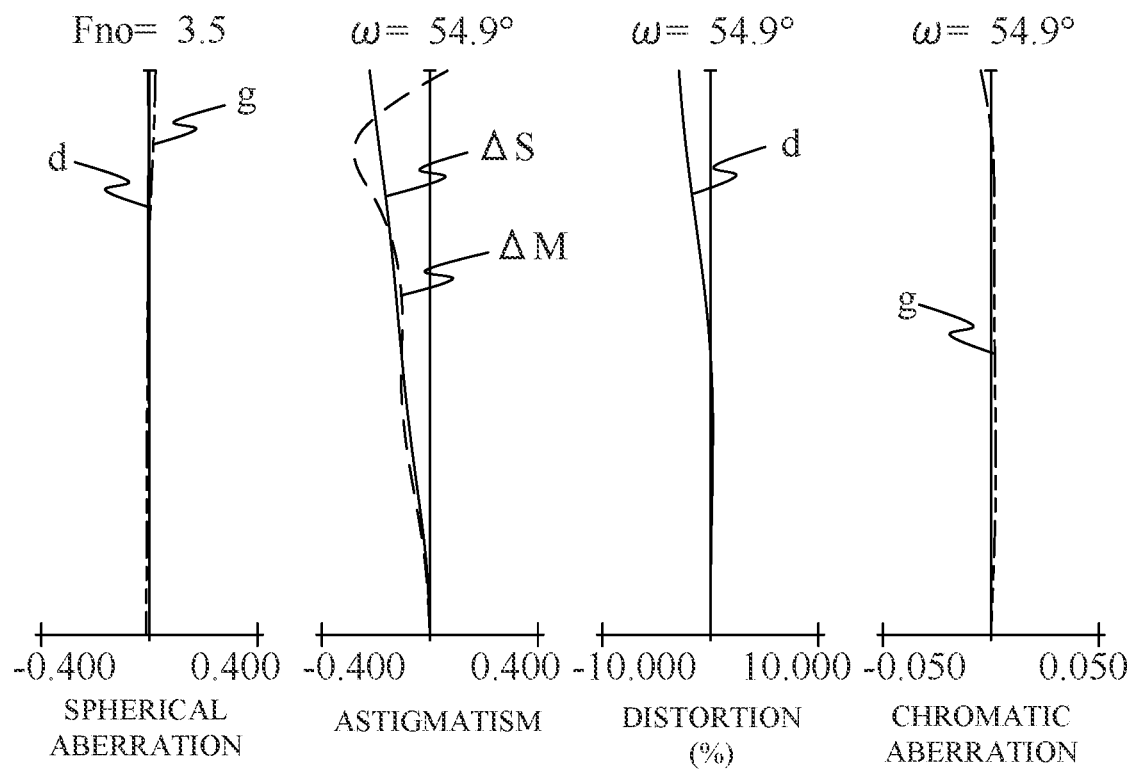
Figure 12C:
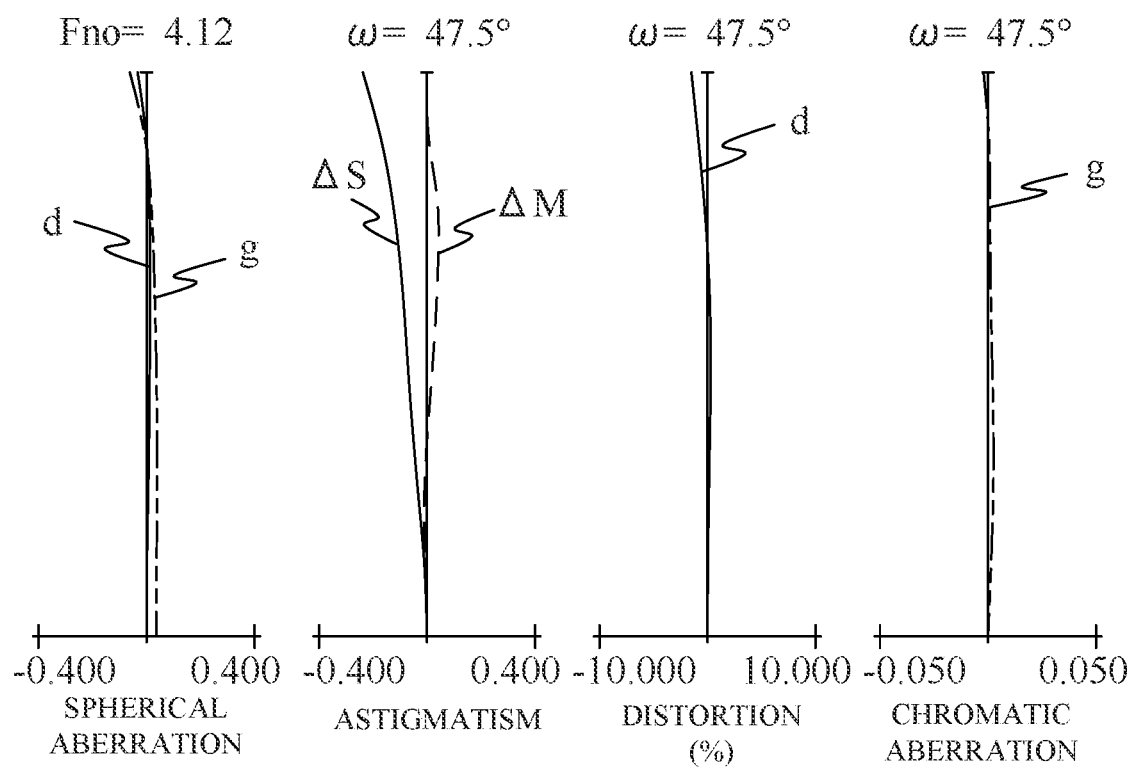

Referring now to the accompanying drawings, a description will be given of a zoom lens according to examples of the present disclosure and an image pickup apparatus having the zoom lens.

FIGS. 1, 3, 5, 7, 9, and 11 are sectional views of zoom lenses L0 according to Examples 1 to 6, respectively, in in-focus states at infinity at the wide-angle ends. The zoom lens L0 according to each example is used in an optical apparatus including an interchangeable lens and an image pickup apparatus, such as a digital video camera, a digital still camera, a broadcasting camera, a film-based camera, and a surveillance camera.

In each sectional view, a left side is an object side, and a right side is an image side. The zoom lens L0 according to each example includes a plurality of lens units. The lens unit in this specification is an element of the zoom lens L0, which includes one or more lenses. In the zoom lens L0 according to each example, distances between adjacent lens units change during zooming from the wide-angle end to the telephoto end. The lens unit may include an aperture stop (diaphragm).

In each sectional view, Li represents an i-th (i is a natural number) lens unit counted from the object side among the lens units included in the zoom lens L0. LR represents a rear group including all lens units disposed on the image side of the second lens unit L2. LIS represents a partial unit (image stabilizing unit) having an image stabilizing function by moving in a direction including a component in the direction orthogonal to the optical axis. A subunit in this specification refers to a group of one or more lenses whose structural length (distance from a lens surface closest to the object to a lens surface closest to the image plane in the subunit) does not change during zooming. That is, the subunit can be one lens unit or part of one lens unit. LN represents a lens unit disposed closest to the image plane.

SP represents the aperture stop. IP represents an image plane. In a case where the zoom lens L0 according to each example is used as an imaging optical system of a digital still camera or a digital video camera, the imaging plane of a solid-state image sensor (photoelectric conversion element) such as a CCD sensor or a CMOS sensor is placed on the image plane IP. In a case where the zoom lens L0 according to each example is used as an imaging optical system of a film-based camera, a photosensitive plane corresponding to the film plane is placed on the image plane IP.

A solid arrow illustrated in each lens sectional view simply represents a moving locus of each lens unit during zooming from the wide-angle end to the telephoto end. In this specification, the wide-angle end and the telephoto end are zoom positions where each lens unit is mechanically located at both ends of a movable range on the optical axis. A dashed arrow illustrated in each lens sectional view simply represents a moving locus of the lens unit during focusing from infinity to a close distance (short distance).

The zoom lens L0 according to each example includes, in order from the object side to the image side, a first lens unit L1 having negative refractive power, a second lens unit L2 having positive refractive power, and a rear group LR including one or more lens units. The rear group LR includes all lens units disposed on the image side of the second lens unit L2.

The first lens unit L1 includes, in order from the object side to the image side, three or more negative lenses. The second lens unit L2 consists of a single positive lens GP, and the positive lens GP moves from the object side to the image side during focusing from infinity to a close distance.

Each of the zoom lenses L0 according to Examples 1 and 2 includes, in order from the object side, a first lens unit L1, a second lens unit L2, a third lens unit L3 having positive refractive power, and a fourth lens unit L4 having positive refractive power. In the zoom lenses L0 according to Examples 1 and 2, the third lens unit L3 and the fourth lens unit L4 correspond to the rear group LR. During zooming from the wide-angle end to the telephoto end, the first lens unit L1 moves along a locus that is convex toward the image side, the second lens unit L2 and the third lens unit L3 monotonously move toward the object side, and the fourth lens unit L4 is fixed. Here, the locus that is convex toward the image side of the lens unit A means that a moving amount of the lens unit A from the wide-angle end in the in-focus state at infinity of the lens unit A has the maximum value in an intermediate area during zooming while the moving amount has a positive value in a case where the lens unit A moves toward the image plane.

The zoom lens L0 according to Example 3 includes, in order from the object side, a first lens unit L1, a second lens unit L2, a third lens unit L3 having positive refractive power, and a fourth lens unit L4 having positive refractive power. In the zoom lens L0 according to Example 3, the third lens unit L3 and the fourth lens unit L4 correspond to the rear group LR. During zooming from the wide-angle end to the telephoto end, the first lens unit L1 moves along a locus that is convex toward the image side, the second lens unit L2 and the third lens unit L3 monotonously move toward the object side, and the fourth lens unit L4 monotonously moves toward the image side.

The zoom lens L0 according to Example 4 includes, in order from the object side, a first lens unit L1, a second lens unit L2, a third lens unit L3 having positive refractive power, a fourth lens unit L4 having negative refractive power, and a fifth lens unit L5 having positive refractive power. In the zoom lens L0 according to Example 4, the third lens unit L3, the fourth lens unit L4, and the fifth lens unit L5 correspond to the rear group LR. During zooming from the wide-angle end to the telephoto end, the first lens unit L1 moves along a locus that is convex toward the image side, and the second lens unit L2, the third lens unit L3, and the fourth lens unit L4 monotonously move toward the object side, and the fifth lens unit L5 monotonously moves toward the image side.

The zoom lens L0 according to Example 5 includes, in order from the object side, a first lens unit L1, a second lens unit L2, a third lens unit L3 having negative refractive power, and a fourth lens unit L4 having positive refractive power, and a fifth lens unit L5 having negative refractive power. In the zoom lens L0 according to Example 5, the third lens unit L3, the fourth lens unit L4, and the fifth lens unit L5 correspond to the rear group LR. During zooming from the wide-angle end to the telephoto end, the first lens unit L1 moves along a locus that is convex toward the image side, and the second lens unit L2, the third lens unit L3, the fourth lens unit L4, and the fifth lens unit L5 monotonously move toward the object side.

The zoom lens L0 according to Example 6 includes, in order from the object side, a first lens unit L1, a second lens unit L2, a third lens unit L3 having negative refractive power, a fourth lens unit L4 having positive refractive power, a fifth lens unit L5 having negative refractive power, and a sixth lens unit L6 having positive refractive power. In the zoom lens L0 according to Example 6, the third lens unit L3, the fourth lens unit L4, the fifth lens unit L5, and the sixth lens unit L6 correspond to the rear group LR. During zooming from the wide-angle end to the telephoto end, the first lens unit L1 moves along a locus that is convex toward the image side, and the second lens unit L2, the third lens unit L3, the fourth lens unit L4, and the fifth lens unit L5 monotonously move toward the object side, and the sixth lens unit L6 is fixed.

The zoom lenses L0 according to Examples 1 to 6 are designed to permit the occurrence of distortion. Due to the use of the electronic aberration correcting technology developed in recent years, image distortion caused by the distortion can be corrected by this image processing technology. Thus, each of the imaging optical systems having these zoom lenses L0 store a design value (distortion correcting data) of the distortion amount of the zoom lens L0 in its memory. An electronic image captured using the imaging optical system is corrected by image processing in an arbitrary image processing unit (such as a CPU attached to an image pickup apparatus such as a camera body) using the design value of the distortion amount.

A zoom lens that permits the occurrence of distortion does not require a distortion correcting lens, and can easily reduce the size and weight of the zoom lens.

In particular, an effective imaging range (effective image circle diameter) of the image sensor at the wide-angle end is made smaller than an effective imaging range (effective image circle diameter) of the image sensor at the telephoto end, and the diameter of the front lens can be made smaller by performing the above distortion correction.

In the zoom lens L0 according to each example, a part of the lens or a part of the lens unit may be moved eccentrically to the optical axis in a direction parallel to the direction orthogonal to the optical axis for image stabilization so that the zoom lens L0 serves as an image stabilizing optical system. A parallel plate having substantially no refractive power, such as a low-pass filter or an infrared cut filter, may be disposed between the lens disposed closest to the image plane and the image plane IP. In other words, the rear group LR may include a parallel plate on the image side of the lens disposed closest to the image plane.

FIGS. 2A to 2C, 4A to 4C, 6A to 6C, 8A to 8C, 10A to 10C, and 12A to 12C are aberration diagrams of the zoom lenses L0 according to Examples 1 to 6, respectively. FIGS. 2A, 4A, 6A, 8A, 10A, and 12A are aberration diagrams at the wide-angle end. FIGS. 2B, 4B, 6B, 8B, 10B, and 12B are aberration diagrams at the intermediate (middle) zoom position. FIGS. 2C, 4C, 6C, 8C, 10C, and 12C are aberration diagrams at the telephoto end.

In a spherical aberration diagram, Fno represents an F-number. The spherical aberration diagram indicates spherical aberration amounts for the d-line (wavelength 587.6 nm) and g-line (wavelength 435.8 nm). In an astigmatism diagram, ΔS indicates an astigmatism amount on a sagittal image plane, and ΔM indicates an astigmatism amount on a meridional image plane. A distortion diagram illustrates a distortion amount for the d-line. A chromatic aberration diagram illustrates a chromatic aberration amount for the g-line. ω is an imaging half angle of view (°), which is the angle of view by paraxial calculation.

A description will now be given of a characteristic configuration of the zoom lens L0 according to each example.

The zoom lens L0 according to each example includes, in order from the object side to the image side, a first lens unit L1 having negative refractive power, a second lens unit L2 having positive refractive power, and a rear group LR including one or more lens units. The zoom lens L0 according to each example is a so-called negative lead type zoom lens in which the refractive power of the first lens unit L1 is negative. The negative lead type zoom lens is known as an effective configuration particularly for widening the angle of view of the zoom lens. The first lens unit L1 includes, in order from the object side to the image side, three or more negative lenses. Thereby, a sufficiently wide angle of view can be secured in each example (such as an angle of view of 100° or more at the wide-angle end).

The second lens unit L2 includes a single positive lens GP, and the positive lens GP moves from the object side to the image side during focusing from infinity to a close distance. In a zoom lens, in a case where the height of the off-axis light ray incident on a lens unit is high, the lens diameter becomes large. Therefore, in order to reduce the size and weight of the focus lens unit, it is important to dispose the focus lens unit at a position where the height of off-axis ray is low. By disposing the second lens unit L2 as the focus lens unit near the aperture stop SP, the height of the off-axis ray entering the focus lens unit can be reduced. By forming the focus lens unit with a single positive lens GP, the weight of the focus lens unit can be reduced. In order to suppress chromatic aberration fluctuations during focusing, it is important to properly set the glass material of the positive lens GP.

Accordingly, in the zoom lens L0 according to each example, the arrangement of the focus lens unit and the glass material of the focus lens unit are properly set. More specifically, the zoom lens L0 according to each example satisfies the following inequalities (1) and (2):

$$0.48 < D2w/TLw < 0.65 \quad (1)$$

$$25 < vdGP < 45 \quad (2)$$

Here, TLw is an overall optical length of the zoom lens L0 at the wide-angle end. The overall optical length is a distance on the optical axis from the lens surface closest to the object of the zoom lens L0 to the image plane IP. D2w is a distance on the optical axis from the lens surface closest to the object of the zoom lens L0 at the wide-angle end to the lens surface closest to the object of the second lens unit L2. vdGP is an Abbe number based on the d-line of the positive lens GP.

Inequality (1) defines a ratio of the overall optical length TLw at the wide-angle end to the distance D2w on the optical axis from the lens surface closest to the object to the lens surface closest to the object of the second lens unit L2 at the wide-angle end. In a case where the second lens unit L2 becomes closer to the object and the value D2w/TLw becomes lower than the lower limit of inequality (1), the height of the off-axis light ray incident on the second lens unit L2 increases, and it becomes difficult to reduce the size of the focus lens unit. On the other hand, in a case where the second lens unit L2 becomes closer to the image side and the value D2w/TLw becomes higher than the upper limit of inequality (1), the height of the off-axis ray incident on the second lens unit L2 increases, and miniaturization becomes difficult.

Inequality (2) defines the Abbe number vdGP based on the d-line of the positive lens GP. In a case where the Abbe number becomes lower than the lower limit of inequality (2), it becomes difficult to suppress chromatic aberration fluctuations during focusing. On the other hand, in a case where the Abbe number becomes higher than the upper limit of inequality (2), it becomes difficult to suppress chromatic aberration fluctuations during focusing.

The above configuration can provide the zoom lens L0 that is compact and has excellent optical characteristics.

The zoom lens L0 according to each example may satisfy one or more of the following inequalities (3) to (13):

$$0.35 < DISw/DSPw < 0.80 \quad (3)$$

$$0.04 < Skw/TLw < 0.25 \quad (4)$$

$$-0.45 < fL1/fL2 < -0.15 \quad (5)$$

$$0.00 < |fL1/fLN| < 0.40 \quad (6)$$

$$0.50 < |fLN/fLIS| < 1.60 \quad (7)$$

$$1.60 < ndGP < 1.91 \quad (8)$$

$$35 < vdGIS < 60 \quad (9)$$

$$22 < vdG1P < 50 \quad (10)$$

$$3.5 < (R1+R2)/(R1-R2) < 13.0 \quad (11)$$

$$-1.60 < Ymax\_w/fL1 < -0.40 \quad (12)$$

$$-20.0 < Dist\_w < -8.0 \quad (13)$$

Here, DSPw is a distance on the optical axis from the aperture stop SP to the image plane IP at the wide-angle end. DISw is a distance on the optical axis from the aperture stop SP at the wide-angle end to a lens surface closest to the object of the image stabilizing unit LIS. Skw is a back focus of the zoom lens L0 at the wide-angle end. fL1 is a focal length of the first lens unit L1. fL2 is a focal length of the second lens unit L2. fLN is a focal length of the lens unit disposed closest to the image plane in the zoom lens L0.

fLIS is a focal length of the image stabilizing unit LIS. ndGP is a refractive index for the d-line of the positive lens GP as the focus lens unit. vdGIS is an Abbe number based on the d-line of a negative lens GIS constituting the image stabilizing unit LIS. vdG1P is an Abbe number based on the d-line of a positive lens G1P having the strongest refractive power among positive lenses included in the first lens unit L1. R1 is a radius of curvature of the lens unit on the object side of the negative lens GIS. R2 is a radius of curvature of the lens surface on the image side of the negative lens GIS. Ymax_w is the maximum image height in the in-focus state at infinity at the wide-angle end. Dist_w is a distortion amount at the maximum image height Ymax_w in the in-focus state at infinity at the wide-angle end.

Inequality (3) defines a ratio of the distance DSPw on the optical axis from the aperture stop SP at the wide-angle end to the image plane IP to the distance DISw on the optical axis from the aperture stop SP to the lens surface closest to the object of the image stabilizing unit LIS at the wide-angle end. By disposing the image stabilizing unit LIS at a proper position, it becomes easy to dispose driving units for driving the image stabilizing unit LIS and the focus lens unit while reducing the diameter of the image stabilizing unit LIS. In a case where the distance from the aperture stop SP to the image stabilizing unit LIS becomes shorter and the value DISw/DSPw becomes lower than the lower limit of inequality (3), the distance between the focus lens unit disposed near the aperture stop SP and the image stabilizing unit LIS becomes excessively short. Therefore, it becomes difficult to dispose driving unit for driving the focus lens unit and the image stabilizing unit LIS. On the other hand, in a case where the distance from the aperture stop SP to the image stabilizing unit LIS becomes longer and the value DISw/DSPw becomes higher than the upper limit of inequality (3), the height of the off-axis ray incident on the image stabilizing unit LIS increases. Therefore, it becomes difficult to reduce the diameter of the image stabilizing unit LIS, and it becomes difficult to reduce the size of the zoom lens L0.

Inequality (4) defines a ratio between the back focus Skw at the wide-angle end to the overall optical length TLw at the wide-angle end. In a case where the back focus Skw becomes shorter and the value Skw/TLw becomes lower than the lower limit of inequality (4), it becomes difficult to dispose an optical element such as a low-pass filter near the image sensor that photoelectrically converts an optical image formed by the zoom lens L0. On the other hand, in a case where the back focus Skw becomes longer and the value Skw/TLw becomes higher than the upper limit value of inequality (4), the overall optical length of the zoom lens L0 at the wide-angle end becomes long, and miniaturization becomes difficult.

Inequality (5) defines the ratio between the focal length fL1 of the first lens unit L1 and the focal length fL2 of the second lens unit L2. In a case where the refractive power of the first lens unit L1 becomes weaker and the value fL1/fL2 becomes lower than the lower limit of inequality (5), it becomes difficult to achieve a wide angle of view exceeding 100° at the wide-angle end. In addition, the diameter of the front lens becomes large, and the outer diameter of the zoom lens becomes large. On the other hand, in a case where the refractive power of the first lens unit L1 becomes stronger and the value fL1/fL2 becomes higher than the upper limit of inequality (5), the asymmetry of the refractive power arrangement of the zoom lens L0 increases, and it becomes difficult to correct distortion at the wide-angle end.

Inequality (6) defines a ratio between the focal length fL1 of the first lens unit L1 and the focal length fLN of the lens unit LN located closest to the image plane. Satisfying inequality (6) can achieve both miniaturization and high image quality of the zoom lens L0. In a case where the positive refractive power of the lens unit LN becomes stronger and the value |fL1/fLN| becomes lower than the lower limit of inequality (6), the retrofocus refractive power arrangement becomes strong. Hence, the asymmetry of the refractive power arrangement of the zoom lens L0 increases, and it becomes difficult to correct distortion at the wide-angle end. In addition, it becomes difficult to reduce the overall lens length at the wide-angle end. On the other hand, in a case where the negative refractive power of the lens unit LN becomes stronger and the value |fL1/fLN| becomes higher than the upper limit of inequality (6), it becomes difficult to achieve the retrofocus refractive power arrangement. Therefore, it becomes difficult to widen an imaging angle of view while securing the back focus at the wide-angle end.

Inequality (7) defines a ratio of the focal length fLN of the lens unit LN disposed closest to the image plane to the focal length fLIS of the image stabilizing unit LIS. In a case where the refractive power of the image stabilizing unit LIS becomes weaker and the value |fLN/fLIS| becomes lower than the lower limit of inequality (7), the moving amount of the image stabilizing unit LIS during image stabilization becomes too large, and it becomes difficult to reduce the outer diameter of the zoom lens. On the other hand, in a case where the refractive power of the image stabilizing unit LIS becomes stronger and the value |fLN/fLIS| becomes higher than the upper limit of inequality (7), it becomes difficult to suppress fluctuations in coma and curvature of field during image stabilization.

Inequality (8) defines the refractive index ndGP for the d-line of the positive lens GP as the focus lens unit. In a case where the refractive index of the positive lens GP becomes lower than the lower limit of inequality (8), the curvature of the positive lens GP becomes sharp in order to provide the positive lens GP with the necessary refractive power. Therefore, it becomes difficult to suppress various aberrations fluctuations including astigmatism during focusing. On the other hand, in a case where the refractive index of the positive lens GP becomes higher than the upper limit of inequality (8), the curvature of the positive lens GP becomes loose, and it becomes difficult to suppress various aberrational fluctuations including spherical aberration during focusing.

Inequality (9) defines the Abbe number vdGIS based on the d-line of the negative lens GIS that constitutes the image stabilizing unit LIS. In a case where the Abbe number of the negative lens GIS becomes lower than the lower limit of inequality (9), it becomes difficult to correct lateral chromatic aberration during image stabilization. On the other hand, in a case where the Abbe number of the negative lens GIS becomes higher than the upper limit of inequality (9), the refractive index of the negative lens GIS becomes low, the moving amount of the image stabilizing unit LIS during image stabilization becomes too large, and it becomes difficult to reduce the outer diameter of the zoom lens.

Inequality (10) defines the Abbe number vdG1P based on the d-line of the positive lens G1P having the strongest refractive power among the positive lenses included in the first lens unit L1. Here, the refractive power is represented by the reciprocal of the focal length, and strong refractive power means that the reciprocal of the focal length is large. In a case where the Abbe number of the positive lens G1P becomes lower than the lower limit of inequality (10), it becomes difficult to correct lateral chromatic aberration during zooming. On the other hand, in a case where the Abbe number of the positive lens G1P becomes higher than the upper limit of inequality (10), it becomes difficult to correct longitudinal chromatic aberration during zooming.

Inequality (11) defines the shape of the negative lens GIS that constitutes the image stabilizing lens unit. The negative lens GIS has a meniscus shape with a convex surface facing the object side, and suppresses coma fluctuations during image stabilization. In a case where the value (R1+R2)/(R1−R2) becomes lower than the lower limit of inequality (11), it becomes difficult to suppress coma fluctuations during image stabilization. On the other hand, in a case where the value (R1+R2)/(R1−R2) becomes higher than the upper limit of inequality (11), it becomes difficult to suppress coma fluctuations during image stabilization.

Inequality (12) defines a ratio between the maximum image height Ymax_w that can be captured at the wide-angle end and the focal length fL1 of the first lens unit L1. The maximum image height Ymax_w is the distance from the optical axis of an image point farthest from the optical axis among image points that can be captured, and is the maximum image height considering the magnification change due to the distortion amount. Using a mechanism and an optical system that match this maximum image height is effective to reduce the sizes and weights of the optical system and lens apparatus. In a case where the maximum image height becomes smaller and the value Ymax_w/fL1 becomes lower than the lower limit of inequality (12), the angle of view becomes narrower than a desired imaging angle of view. On the other hand, in a case where the maximum image height becomes larger and the value Ymax_w/fL1 becomes higher than the upper limit of inequality (12), light in a range wider than the desired imaging angle of view is imaged on the imaging plane, and thus the mechanism and optical system become excessively large, and it becomes difficult to reduce their sizes and weights.

Inequality (13) defines the distortion amount Dist_w at the maximum image height Ymax_w in the in-focus state at infinity at the wide-angle end. In a case where the distortion amount Dist_w becomes lower than the lower limit of inequality (13), it becomes difficult to suppress peripheral image quality deterioration during electronic distortion correction. On the other hand, in a case where the distortion amount Dist_w becomes higher than the upper limit of inequality (13), the distortion amount in the equidistant projection method becomes excessively large, and peripheral image quality significantly deteriorates during image stabilization. In addition, even during lens-shift image stabilization, an image stabilizing amount in the peripheral portion becomes insufficient.

A distortion amount will now be defined. A distortion amount Dist_w [%] at an arbitrary image height at the wide-angle end can be expressed as follows:

$$Dist\_w[\%]=((yp-y)/y1)\times100$$

where y is an ideal image height in the central projection method, and yp is a real image height in the optical system.

Here, the ideal image height y in the central projection method is a value defined as follows using the focal length f of the entire optical system and a half angle of view $\theta i$ of the real ray at the arbitrary image height.

$$y=f\tan\theta i$$

At the maximum image height, the ideal image height y can be expressed as follows using the focal length f of the entire optical system and the half angle of view $\theta$ of the real ray at the maximum image height.

$$y1=f\tan\theta$$

Inequalities (1) to (13) may be replaced with inequalities (1a) to (13a) below:

$$0.49<D2w/TLw<0.60 \tag{1a}$$

$$27<\nu dGP<43 \tag{2a}$$

$$0.38<DISw/DSPw<0.70 \tag{3a}$$

$$0.05<Skw/TLw<0.20 \tag{4a}$$

$$0.40<fL1/fL2<-0.17 \tag{5a}$$

$$0.00<|fL1/fLN|<0.35 \tag{6a}$$

$$0.60<|fLN/fLIS|<1.50 \tag{7a}$$

$$1.63<ndGP<1.89 \tag{8a}$$

$$37<\nu dGIS<55 \tag{9a}$$

$$25<\nu dG1P<45 \tag{10a}$$

$$4.0<(R1+R2)/(R1-R2)<11.0 \tag{11a}$$

$$1.40<Ymax\_w/fL1<-0.60 \tag{12a}$$

$$16.0<Dist\_w<-9.0 \tag{13a}$$

Inequalities (1) to (13) may be replaced with inequalities (1b) to (13b) below:

$$0.50<D2w/TLw<0.55 \tag{1b}$$

$$28<\nu dGP<40 \tag{2b}$$

$$0.41<DISw/DSPw<0.60 \tag{3b}$$

$$0.06<Skw/TLw<0.15 \tag{4b}$$

$$-0.38<fL1/fL2<-0.20 \tag{5b}$$

$$0.00<|fL1/fLN|<0.30 \tag{6b}$$

$$0.70<|fLN/fLIS|<1.40 \tag{7b}$$

$$1.65<ndGP<1.87 \tag{8b}$$

$$39<\nu dGIS<50 \tag{9b}$$

$$28<\nu dG1P<42 \tag{10b}$$

$$4.5<(R1+R2)/(R1-R2)<9.0 \tag{11b}$$

$$-1.20<Ymax\_w/fL1<-0.80 \tag{12b}$$

$$-14.0<Dist\_w<-10.0 \tag{13b}$$

A description will now be given of the configuration that may be satisfied in the zoom lens L0 according to each example.

The first lens unit L1 may include four or more negative lenses and at least one positive lens. The first lens unit L1 may be movable during zooming. The distance between the first lens unit L1 and the second lens unit L2 may be maximum at the wide-angle end among the distances between adjacent lens units in the zoom lens L0. This configuration can achieve a sufficient magnification variation ratio (such as about twice) while achieving a sufficiently wide angle (such as an angle of view of 100° or higher at the wide-angle end).

The aperture stop SP may be disposed on the object side of the second lens unit L2, and the aperture stop SP may monotonously move toward the object side during zooming from the wide-angle end to the telephoto end. This configuration can reduce the size of the aperture stop SP.

The rear group LR may include two or more lens units in which the distance between adjacent lens units changes during zooming. This configuration can achieve a sufficient magnification variation ratio (such as about twice).

The lens unit LN disposed closest to the image plane may consist of three or less lenses. This configuration can reduce the size of the zoom lens L0.

The lens unit LN disposed closest to the image plane in the zoom lens L0 may be fixed during zooming.

Numerical examples 1 to 6 corresponding to Examples 1 to 6, respectively, will be illustrated below.

In surface data in each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical element, and vd represents an Abbe number of the optical element. The Abbe number vd of a certain material is expressed as follows:

$$vd = (Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In each numerical example, values of d, focal length (mm), F-number, and half angle of view (°) are set in a case where the optical system according to each example is in an in-focus state on an infinity object. A "back focus BF" is a distance on the optical axis from the final lens surface (lens surface closest to the image plane) to the paraxial image plane expressed in air conversion length. An "overall lens length" is a length obtained by adding the back focus to a distance on the optical axis from the frontmost lens surface (lens surface closest to the object) to the final lens surface of the optical system. The "lens unit" includes one or more lenses.

In a case where the optical surface is an aspherical surface, an asterisk * is attached to the right side of the surface number. The aspherical shape is expressed as follows:

$$X = (h^2/R)/[1+\{1-(1+k)(h/R)^2\}^{1/2}] + A4 \times h^4 + A6 \times h^6 + A8 \times h^8 + A10 \times h^{10} + A12 \times h^{12}$$

where X is a displacement amount from a surface vertex in the optical axis direction, h is a height from the optical axis in a direction orthogonal to the optical axis, a light traveling direction is set positive, R is a paraxial radius of curvature, k is a conic constant, and A4, A6, A8, A10, and A12 are aspherical coefficients. "e±XX" in each aspheric coefficient means "×10$^{\pm XX}$."

NUMERICAL EXAMPLE 1
UNIT: mm

SURFACE DATA

| Surface No | r | d | nd | vd |
|---|---|---|---|---|
| 1* | 37.000 | 3.00 | 1.58313 | 59.4 |
| 2* | 17.814 | 12.20 | | |
| 3 | 52.582 | 1.23 | 1.91082 | 35.2 |
| 4 | 17.849 | 5.54 | | |
| 5 | 30.037 | 1.15 | 1.59282 | 68.6 |
| 6 | 18.728 | 9.86 | | |
| 7 | −28.561 | 1.10 | 1.43875 | 94.7 |
| 8 | 33.065 | 4.99 | 1.88300 | 40.8 |
| 9 | −88.917 | (variable) | | |
| 10 | (aperture stop) | ∞ | (variable) | |
| 11 | 76.538 | 1.86 | 1.72047 | 34.7 |
| 12 | −170.686 | (variable) | | |
| 13 | 21.236 | 0.69 | 1.80810 | 22.8 |
| 14 | 10.223 | 4.67 | 1.67300 | 38.3 |
| 15 | 101.506 | 0.80 | | |
| 16 | −48.763 | 0.55 | 1.88300 | 40.8 |
| 17 | 13.497 | 2.73 | 1.92286 | 20.9 |
| 18 | 39.963 | 0.35 | | |
| 19 | 19.540 | 5.55 | 1.49700 | 81.5 |
| 20* | −31.043 | 0.15 | | |
| 21 | 18.566 | 0.64 | 2.05090 | 26.9 |
| 22 | 11.089 | 7.99 | 1.49700 | 81.5 |
| 23 | −43.632 | 0.35 | | |
| 24 | 22.204 | 0.90 | 1.88300 | 40.8 |
| 25 | 16.576 | 5.56 | | |
| 26* | −26.667 | 1.90 | 1.85400 | 40.4 |
| 27* | −55.445 | (variable) | | |
| 28 | −497.495 | 7.36 | 1.49700 | 81.5 |
| 29 | −33.423 | (variable) | | |
| image plane | ∞ | | | |

ASPHERIC DATA

1st Surface

K = 0.00000e+00  A4 = 2.59429e−06  A6 = −2.61399e−08
A8 = 5.21697e−11  A10 = −5.59197e−14  A12 = 3.27515e−17
A14 = −8.57311e−21

2nd Surface

K = −8.76022e−01  A4 = 9.21103e−06  A6 = −3.58438e−08
A8 = −4.52147e−11  A10 = 2.92832e−13  A12 = −4.25258e−16
A14 = 2.03592e−19

20th Surface

K = 0.00000e+00  A4 = 2.45229e−05  A6 = −3.72036e−08
A8 = −1.08800e−09  A10 = 1.03970e−11  A12 = −1.91023e−14

26th Surface

K = 0.00000e+00  A4 = 1.66615e−04  A6 = −1.90317e−06
A8 = 1.23230e−08  A10 = −9.41453e−11  A12 = 4.39584e−13

27th Surface

K = 0.00000e+00  A4 = 1.69532e−04  A6 = −1.38711e−06
A8 = 4.53596e−09  A10 = −6.87436e−12  A12 = 2.41668e−14

VARIOUS DATA
ZOOM RATIO 1.88

| | WIDE | MIDDLE | TELE |
|---|---|---|---|
| FOCAL LENGTH | 10.33 | 15.00 | 19.39 |
| Fno | 4.08 | 4.08 | 4.12 |
| Half Angle of View (°) | 61.36 | 55.26 | 48.13 |
| Image Height | 18.92 | 21.64 | 21.64 |
| Overall Lens Length | 128.82 | 122.35 | 123.27 |
| BF | 12.13 | 12.13 | 12.13 |
| d9 | 24.06 | 9.31 | 2.42 |
| d10 | 3.18 | 3.92 | 3.78 |
| d12 | 4.97 | 4.23 | 4.37 |
| d27 | 3.36 | 11.64 | 19.44 |
| d29 | 12.13 | 12.13 | 12.13 |

NUMERICAL EXAMPLE 1
UNIT: mm

ZOOM LENS UNIT DATA

| Lens Unit | Starting Surface | Focal Length |
|---|---|---|
| 1 | 1 | −19.37 |
| 2 | 11 | 73.58 |
| 3 | 13 | 49.46 |
| 4 | 28 | 71.72 |

NUMERICAL EXAMPLE 2
UNIT: mm

SURFACE DATA

| Surface No | r | d | nd | vd |
|---|---|---|---|---|
| 1* | 36.964 | 2.00 | 1.76450 | 49.1 |
| 2* | 17.381 | 12.97 | | |
| 3 | 38.540 | 1.00 | 1.83400 | 37.2 |
| 4 | 17.838 | 8.18 | | |
| 5 | 35.542 | 1.00 | 1.49700 | 81.5 |
| 6 | 17.493 | 9.44 | | |
| 7 | −32.408 | 0.80 | 1.43875 | 94.7 |
| 8 | 29.388 | 4.33 | 1.88300 | 40.8 |
| 9 | −153.902 | (variable) | | |
| 10 | (aperture stop) | ∞ | (variable) | |
| 11 | 60.063 | 1.50 | 1.77047 | 29.7 |
| 12 | 4073.289 | (variable) | | |
| 13 | 24.469 | 0.50 | 1.80810 | 22.8 |
| 14 | 10.086 | 6.29 | 1.80610 | 33.3 |
| 15 | 65.185 | 0.67 | | |
| 16 | −92.079 | 0.50 | 2.00100 | 29.1 |
| 17 | 10.799 | 3.89 | 1.86966 | 20.0 |
| 18 | 60.938 | 0.10 | | |
| 19 | 18.584 | 4.65 | 1.43875 | 94.7 |
| 20* | −29.965 | 0.10 | | |
| 21 | 16.998 | 0.50 | 2.05090 | 26.9 |
| 22 | 11.071 | 6.27 | 1.43875 | 94.7 |
| 23 | −72.227 | 4.03 | | |
| 24 | 21.999 | 0.90 | 1.88300 | 40.8 |
| 25 | 16.878 | 5.45 | | |
| 26* | −21.844 | 1.20 | 1.85400 | 40.4 |
| 27* | −29.304 | (variable) | | |
| 28 | −242.542 | 7.32 | 1.49700 | 81.5 |
| 29 | −31.336 | (variable) | | |
| image plane | ∞ | | | |

ASPHERIC DATA

1st Surface

K = 0.00000e+00 A4 = −5.05120e−07 A6 = −2.59180e−08
A8 = 5.64585e−11 A10 = −6.28825e−14 A12 = 3.59492e−17
A14 = −8.73398e−21

2nd Surface

K = −8.50179e−01 A4 = 6.50619e−06 A6 = −3.67327e−08
A8 = −4.18782e−11 A10 = 3.45919e−13 A12 = −5.82222e−16
A14 = 3.42039e−19

20th Surface

K = 0.00000e+00 A4 = 1.88217e−05 A6 = −1.07644e−07
A8 = −8.81979e−10 A10 = 3.51547e−12 A12 = 2.13797e−14

26th Surface

K = 0.00000e+00 A4 = 1.99287e−04 A6 = −1.86752e−06
A8 = 9.76715e−09 A10 = −7.11283e−11 A12 = 4.03250e−13

27th Surface

K = 0.00000e+00 A4 = 2.02967e−04 A6 = −1.31168e−06
A8 = 1.15301e−09 A10 = 2.03422e−11 A12 = −3.00629e−14

NUMERICAL EXAMPLE 2
UNIT: mm

VARIOUS DATA
ZOOM RATIO 1.94

| | WIDE | MIDDLE | TELE |
|---|---|---|---|
| FOCAL LENGTH | 9.20 | 16.04 | 17.90 |
| Fno | 4.08 | 4.08 | 4.12 |
| Half Angle of View (°) | 64.04 | 53.45 | 50.40 |
| Image Height | 18.90 | 21.64 | 21.64 |
| Overall Lens Length | 125.26 | 118.57 | 119.35 |
| BF | 10.50 | 10.50 | 10.50 |
| d9 | 24.00 | 4.83 | 2.21 |
| d10 | 2.10 | 3.01 | 3.07 |
| d12 | 4.14 | 3.23 | 3.17 |
| d27 | 0.93 | 13.41 | 16.81 |
| d29 | 10.50 | 10.50 | 10.50 |

ZOOM LENS UNIT DATA

| Lens Unit | Starting Surface | Focal Length |
|---|---|---|
| 1 | 1 | −17.03 |
| 2 | 11 | 79.11 |
| 3 | 13 | 42.64 |
| 4 | 28 | 71.58 |

NUMERICAL EXAMPLE 3
UNIT: mm

SURFACE DATA

| Surface No | r | d | nd | vd |
|---|---|---|---|---|
| 1* | 34.540 | 2.00 | 1.76450 | 49.1 |
| 2* | 17.538 | 12.00 | | |
| 3 | 27.845 | 1.00 | 2.05090 | 26.9 |
| 4 | 17.335 | 12.15 | | |
| 5 | −102.534 | 1.00 | 1.49700 | 81.5 |
| 6 | 24.557 | 4.63 | | |
| 7 | −163.874 | 1.40 | 1.83400 | 37.2 |
| 8 | −79.091 | 0.80 | 1.43875 | 94.7 |
| 9 | 23.675 | 5.93 | 1.88300 | 40.8 |
| 10 | 685.207 | (variable) | | |
| 11 | (aperture stop) | ∞ | (variable) | |
| 12 | 73.782 | 1.50 | 1.85025 | 30.1 |
| 13 | −353.985 | (variable) | | |
| 14 | 22.242 | 0.50 | 1.96300 | 24.1 |
| 15 | 10.175 | 6.30 | 1.88300 | 40.8 |
| 16 | 40.767 | 0.92 | | |
| 17 | −465.076 | 0.50 | 1.91082 | 35.2 |
| 18 | 10.734 | 4.46 | 1.86966 | 20.0 |
| 19 | 30.913 | 0.10 | | |
| 20 | 17.320 | 4.70 | 1.43875 | 94.7 |
| 21* | −61.628 | 0.10 | | |
| 22 | 17.378 | 0.50 | 2.05090 | 26.9 |
| 23 | 11.257 | 7.57 | 1.43875 | 94.7 |
| 24 | −32.482 | 1.49 | | |
| 25 | 27.690 | 0.90 | 1.88300 | 40.8 |
| 26 | 20.124 | 5.98 | | |
| 27* | −29.240 | 1.20 | 1.85400 | 40.4 |
| 28* | −43.741 | (variable) | | |
| 29 | −130.532 | 6.39 | 1.49700 | 81.5 |
| 30 | −34.115 | (variable) | | |
| image plane | ∞ | | | |

ASPHERIC DATA

1st Surface

K = 0.00000e+00 A4 = −5.58771e−07 A6 = −1.77995e−08
A8 = 4.41109e−11 A10 = −6.23317e−14 A12 = 4.47696e−17
A14 = −1.40227e−20

NUMERICAL EXAMPLE 3
UNIT: mm

2nd Surface

K = −8.15972e−01 A4 = 8.81718e−06 A6 = −1.49702e−08
A8 = −1.54936e−11 A10 = 2.29531e−13 A12 = −5.29361e−16
A14 = 3.75849e−19

21st Surface

K = 0.00000e+00 A4 = 1.85120e−05 A6 = −1.09055e−07
A8 = 4.00606e−10 A10 = −1.62869e−11 A12 = 9.72903e−14

27th Surface

K = 0.00000e+00 A4 = 3.73139e−05 A6 = −5.43373e−07
A8 = 2.13025e−09 A10 = −2.57230e−11 A12 = 1.92965e−13

28th Surface

K = 0.00000e+00 A4 = 5.07750e−05 A6 = −4.00620e−07
A8 = 1.66532e−10 A10 = 4.59683e−12 A12 = 8.96637e−15

VARIOUS DATA
ZOOM RATIO 2.12

|  | WIDE | MIDDLE | TELE |
|---|---|---|---|
| FOCAL LENGTH | 11.30 | 16.61 | 23.90 |
| Fno | 4.08 | 4.08 | 4.12 |
| Half Angle of View (°) | 59.29 | 52.49 | 42.15 |
| Image Height | 19.02 | 21.64 | 21.64 |
| Overall Lens Length | 129.79 | 125.70 | 129.33 |
| BF | 14.54 | 12.80 | 10.54 |
| d10 | 24.00 | 10.61 | 2.20 |
| d11 | 2.10 | 2.30 | 2.09 |
| d13 | 3.77 | 3.57 | 3.78 |
| d28 | 1.36 | 12.39 | 26.70 |
| d30 | 14.54 | 12.80 | 10.54 |

ZOOM LENS UNIT DATA

| Lens Unit | Starting Surface | Focal Length |
|---|---|---|
| 1 | 1 | −19.47 |
| 2 | 12 | 71.93 |
| 3 | 14 | 53.25 |
| 4 | 29 | 90.93 |

NUMERICAL EXAMPLE 4
UNIT: mm

SURFACE DATA

| Surface No | r | d | nd | vd |
|---|---|---|---|---|
| 1* | 35.655 | 2.00 | 1.55332 | 71.7 |
| 2 | 18.553 | 10.14 | | |
| 3 | 43.354 | 1.00 | 1.96300 | 24.1 |
| 4 | 18.994 | 9.15 | | |
| 5 | 54.034 | 1.00 | 1.59270 | 35.3 |
| 6 | 26.677 | 8.97 | | |
| 7 | −33.675 | 0.80 | 1.49700 | 81.5 |
| 8 | 35.482 | 6.14 | 1.85883 | 30.0 |
| 9 | −84.554 | (variable) | | |
| 10 | (aperture stop) | ∞ | (variable) | |
| 11 | 123.998 | 1.70 | 1.85025 | 30.1 |
| 12 | −234.488 | (variable) | | |
| 13* | 26.749 | 1.00 | 1.80810 | 22.8 |
| 14 | 13.432 | 7.73 | 1.80610 | 40.7 |
| 15 | 83.403 | 0.67 | | |
| 16 | 495.726 | 0.50 | 2.00100 | 29.1 |
| 17 | 13.374 | 4.37 | 1.94594 | 18.0 |
| 18 | 28.803 | 0.10 | | |
| 19 | 18.829 | 6.49 | 1.43875 | 94.7 |
| 20* | −34.371 | 0.10 | | |
| 21 | 16.112 | 0.50 | 2.05090 | 26.9 |
| 22 | 11.216 | 8.27 | 1.43875 | 94.7 |
| 23 | 373.115 | (variable) | | |
| 24 | 31.589 | 0.90 | 1.88300 | 40.8 |
| 25 | 20.666 | 4.64 | | |
| 26* | −27.639 | 1.20 | 1.80400 | 46.5 |
| 27* | −31.668 | (variable) | | |
| 28 | −110.630 | 1.00 | 1.80610 | 33.3 |
| 29 | −432.539 | 6.50 | 1.59282 | 68.6 |
| 30 | −34.154 | (variable) | | |
| image plane | ∞ | | | |

ASPHERIC DATA

1st Surface

K = 0.00000e+00 A4 = 8.84489e−07 A6 = −1.74958e−08
A8 = 4.77183e−11 A10 = −6.77556e−14 A12 = 5.30183e−17
A14 = −1.85401e−20

2nd Surface

K = −9.16996e−01 A4 = 9.24051e−06 A6 = −2.08874e−08
A8 = 6.43752e−11 A10 = −1.33742e−13 A12 = 3.26127e−16
A14 = −3.48263e−19

13th Surface

K = 0.00000e+00 A4 = −3.08173e−06 A6 = −9.07213e−09
A8 = 3.76703e−11 A10 = −9.38527e−14

20th Surface

K = 0.00000e+00 A4 = 1.39904e−05 A6 = 6.25811e−09
A8 = −8.77158e−10 A10 = 1.49936e−11 A12 = −6.74357e−14

26th Surface

K = 0.00000e+00 A4 = 1.02392e−04 A6 = −1.86870e−07
A8 = −5.03914e−09 A10 = 3.67314e−11 A12 = −3.01596e−14

27th Surface

K = 0.00000e+00 A4 = 1.16632e−04 A6 = −1.10396e−08
A8 = −7.02472e−09 A10 = 5.73923e−11 A12 = −1.51353e−13

VARIOUS DATA
ZOOM RATIO 1.95

|  | WIDE | MIDDLE | TELE |
|---|---|---|---|
| FOCAL LENGTH | 11.30 | 14.97 | 22.00 |
| Fno | 2.89 | 2.89 | 2.89 |
| Half Angle of View (°) | 59.44 | 55.32 | 44.52 |
| Image Height | 19.14 | 21.64 | 21.64 |
| Overall Lens Length | 137.35 | 129.65 | 125.58 |
| BF | 13.50 | 12.41 | 10.50 |
| d9 | 29.39 | 16.54 | 3.44 |
| d10 | 2.10 | 2.10 | 2.53 |
| d12 | 4.88 | 4.88 | 4.45 |
| d23 | 1.00 | 2.19 | 4.27 |
| d27 | 1.61 | 6.66 | 15.52 |
| d30 | 13.50 | 12.41 | 10.50 |

ZOOM LENS UNIT DATA

| Lens Unit | Starting Surface | Focal Length |
|---|---|---|
| 1 | 1 | −20.99 |
| 2 | 11 | 95.60 |
| 3 | 13 | 33.35 |
| 4 | 24 | −57.66 |
| 5 | 28 | 89.95 |

NUMERICAL EXAMPLE 5
UNIT: mm

SURFACE DATA

| Surface No | r | d | nd | vd |
|---|---|---|---|---|
| 1 | 36.363 | 1.60 | 1.76450 | 49.1 |
| 2* | 15.487 | 6.54 | | |
| 3 | 27.280 | 1.00 | 2.05090 | 26.9 |
| 4 | 18.536 | 6.70 | | |
| 5 | 32.793 | 1.00 | 1.49700 | 81.5 |
| 6 | 17.362 | 10.47 | | |
| 7 | −34.260 | 0.80 | 1.43875 | 94.7 |
| 8 | 34.586 | 3.94 | 1.90525 | 35.0 |
| 9 | −201.854 | (variable) | | |
| 10 | (aperture stop) | ∞ | (variable) | |
| 11 | 51.209 | 1.50 | 1.67300 | 38.3 |
| 12 | −111.251 | (variable) | | |
| 13 | −61.646 | 0.80 | 2.00100 | 29.1 |
| 14 | −204.214 | (variable) | | |
| 15 | 19.146 | 0.50 | 2.05090 | 26.9 |
| 16 | 10.112 | 4.75 | 1.80610 | 40.7 |
| 17 | 152.402 | 0.35 | | |
| 18 | −367.791 | 0.50 | 1.91082 | 35.2 |
| 19 | 11.324 | 2.84 | 1.89286 | 20.4 |
| 20 | 31.987 | 0.10 | | |
| 21 | 17.704 | 4.27 | 1.43875 | 94.7 |
| 22* | −54.171 | 0.10 | | |
| 23 | 18.960 | 0.50 | 2.05090 | 26.9 |
| 24 | 11.500 | 8.01 | 1.43875 | 94.7 |
| 25 | −21.312 | 0.49 | | |
| 26 | 21.333 | 1.00 | 1.83481 | 42.7 |
| 27 | 16.304 | (variable) | | |
| 28* | −24.186 | 1.20 | 1.85400 | 40.4 |
| 29* | −41.948 | (variable) | | |
| image plane | ∞ | | | |

ASPHERIC DATA

1st Surface

K = 0.00000e+00 A4 = −7.44158e−06 A6 = 2.17599e−08
A8 = −4.81867e−11 A10 = 6.22617e−14 A12 = −4.40517e−17
A14 = 1.19690e−20
 2nd Surface K = −8.72295e−01 A4 = 5.42531e−07 A6 = 9.78315e−09
A8 = 1.72802e−10 A10 = −9.18661e−13 A12 = 2.12915e−15
A14 = −1.99953e−18
22nd Surface K = 0.00000e+00 A4 = 3.62847e−05 A6 = −2.63477e−07
A8 = 1.92638e−09 A10 = −6.70834e−11 A12 = 4.52971e−13
28th Surface K = 0.00000e+00 A4 = 1.17855e−04 A6 = −1.63605e−06
A8 = 9.00680e−09 A10 = −6.51152e−11 A12 = 3.38027e−13
29th Surface K = 0.00000e+00 A4 = 1.30738e−04 A6 = −1.32589e−06
A8 = 4.36587e−09 A10 = −2.34452e−12 A12 = 1.29797e−14

VARIOUS DATA
ZOOM RATIO 1.90

| | WIDE | MIDDLE | TELE |
|---|---|---|---|
| FOCAL LENGTH | 10.30 | 16.00 | 19.60 |
| Fno | 4.08 | 4.08 | 4.12 |
| Half Angle of View (°) | 61.86 | 53.52 | 47.83 |
| Image Height | 19.26 | 21.64 | 21.64 |
| Overall Lens Length | 114.35 | 105.41 | 104.44 |
| BF | 14.75 | 21.84 | 26.22 |
| d9 | 24.50 | 7.84 | 2.10 |
| d10 | 2.10 | 2.82 | 3.40 |
| d12 | 3.35 | 3.32 | 3.17 |
| d14 | 2.03 | 1.34 | 0.91 |
| d27 | 8.66 | 9.29 | 9.68 |
| d29 | 14.75 | 21.84 | 26.22 |

ZOOM LENS UNIT DATA

| Lens Unit | Starting Surface | Focal Length |
|---|---|---|
| 1 | 1 | −18.06 |
| 2 | 11 | 52.30 |
| 3 | 13 | −88.46 |
| 4 | 15 | 27.53 |
| 5 | 28 | −69.03 |

NUMERICAL EXAMPLE 6
UNIT: mm

SURFACE DATA

| Surface No | r | d | nd | vd |
|---|---|---|---|---|
| 1* | 36.245 | 2.00 | 1.76450 | 49.1 |
| 2* | 18.260 | 13.76 | | |
| 3 | 36.879 | 1.00 | 1.95375 | 32.3 |
| 4 | 18.000 | 10.79 | | |
| 5 | 53.599 | 1.00 | 1.49700 | 81.5 |
| 6 | 21.569 | 8.03 | | |
| 7 | −31.559 | 0.80 | 1.43875 | 94.7 |
| 8 | 31.309 | 4.96 | 1.88300 | 40.8 |
| 9 | −94.449 | (variable) | | |
| 10 | (aperture stop) | ∞ | (variable) | |
| 11 | 53.950 | 1.50 | 1.66565 | 35.6 |
| 12 | −175.277 | (variable) | | |
| 13 | 268.814 | 0.80 | 1.61772 | 49.8 |
| 14 | 56.472 | (variable) | | |
| 15 | 22.881 | 0.50 | 1.96300 | 24.1 |
| 16 | 10.376 | 5.45 | 1.90043 | 37.4 |
| 17 | 94.514 | 0.58 | | |
| 18 | −137.963 | 0.50 | 1.95375 | 32.3 |
| 19 | 10.860 | 3.42 | 1.86966 | 20.0 |
| 20 | 34.673 | 0.10 | | |
| 21 | 17.287 | 5.79 | 1.43875 | 94.7 |
| 22* | −61.411 | 0.10 | | |
| 23 | 16.219 | 0.50 | 2.05090 | 26.9 |
| 24 | 11.080 | 8.94 | 1.43875 | 94.7 |
| 25 | −31.009 | 0.50 | | |
| 26 | 20.448 | 1.00 | 1.83481 | 42.7 |
| 27 | 15.800 | (variable) | | |
| 28* | −15.305 | 1.20 | 1.85400 | 40.4 |
| 29* | −22.734 | (variable) | | |
| 30 | −116.151 | 6.84 | 1.49700 | 81.5 |
| 31 | −29.679 | (variable) | | |
| image plane | ∞ | | | |

ASPHERIC DATA

1st Surface

K = 0.00000e+00 A4 = 3.92202e−08 A6 = −2.69648e−08
A8 = 6.09684e−11 A10 = −7.05373e−14 A12 = 4.15238e−17
A14 = −1.05285e−20
 2nd Surface K = −8.62038e−01 A4 = 8.10669e−06 A6 = −3.15674e−08
A8 = −3.37489e−11 A10 = 3.31967e−13 A12 = −5.81678e−16
A14 = 3.32304e−19
22nd Surface K = 0.00000e+00 A4 = 2.23580e−05 A6 = −1.43420e−07
A8 = 1.13126e−09 A10 = −2.96786e−11 A12 = 1.87767e−13
28th Surface K = 0.00000e+00 A4 = 1.89068e−04 A6 = −1.82499e−06
A8 = 8.70129e−09 A10 = −5.29084e−11 A12 = 3.77732e−13
29th Surface K = 0.00000e+00 A4 = 1.81235e−04 A6 = −1.41031e−06
A8 = 3.38789e−09 A10 = 1.58728e−11 A12 = −5.28155e−14

-continued

NUMERICAL EXAMPLE 6
UNIT: mm

VARIOUS DATA
ZOOM RATIO 1.92

|  | WIDE | MIDDLE | TELE |
|---|---|---|---|
| FOCAL LENGTH | 10.30 | 15.22 | 19.80 |
| Fno | 2.89 | 3.50 | 4.12 |
| Half Angle of View (°) | 61.76 | 54.87 | 47.54 |
| Image Height | 19.18 | 21.64 | 21.64 |
| Overall Lens Length | 132.94 | 126.11 | 127.01 |
| BF | 11.35 | 11.35 | 11.35 |
| d 9 | 24.44 | 9.22 | 2.28 |
| d10 | 2.17 | 2.34 | 2.10 |
| d12 | 3.85 | 4.20 | 4.93 |
| d14 | 2.01 | 1.49 | 1.00 |
| d27 | 7.87 | 7.76 | 7.66 |
| d29 | 1.19 | 9.69 | 17.64 |
| d31 | 11.35 | 11.35 | 11.35 |

ZOOM LENS UNIT DATA

| Lens Unit | Starting Surface | Focal Length |
|---|---|---|
| 1 | 1 | −19.36 |
| 2 | 11 | 62.14 |
| 3 | 13 | −115.90 |
| 4 | 15 | 30.94 |
| 5 | 28 | −59.25 |
| 6 | 30 | 78.16 |

TABLE 1 below summarizes various values of each example.

|  | Example 1 | Example 2 | Example 3 | Example 4 | Example 5 | Example 6 |
|---|---|---|---|---|---|---|
| TLw | 128.82 | 125.26 | 129.79 | 137.35 | 114.35 | 132.94 |
| Skw | 12.13 | 10.50 | 14.54 | 13.50 | 14.75 | 11.35 |
| D2w | 66.31 | 65.82 | 67.01 | 70.69 | 58.65 | 68.95 |
| DSPw | 65.69 | 61.54 | 64.88 | 68.76 | 57.80 | 66.16 |
| DISw | 34.48 | 35.24 | 34.51 | 39.41 | 32.19 | 36.71 |
| fL1 | −19.37 | −17.03 | −19.47 | −20.99 | −18.06 | −19.36 |
| fL2 | 73.58 | 79.11 | 71.93 | 95.60 | 52.30 | 62.14 |
| fLIS | −80.07 | −89.49 | −88.34 | −70.40 | −91.09 | −92.30 |
| fLN | 71.72 | 71.58 | 90.93 | 89.95 | −69.03 | 78.16 |
| ndGP | 1.72 | 1.77 | 1.85 | 1.85 | 1.67 | 1.67 |
| ν d GP | 34.71 | 29.74 | 30.05 | 30.05 | 38.26 | 35.64 |
| ν d GIS | 40.81 | 40.81 | 40.81 | 46.53 | 42.74 | 42.74 |
| ν d G1P | 40.81 | 40.81 | 40.81 | 30.00 | 35.04 | 40.81 |
| R 1 | 22.20 | 22.00 | 27.69 | 31.59 | 21.33 | 20.45 |
| R 2 | 16.58 | 16.88 | 20.12 | 20.67 | 16.30 | 15.80 |
| Ymax_w | 18.92 | 18.90 | 19.02 | 19.14 | 19.26 | 19.18 |
| Dist_w | −12.56 | −12.53 | −11.98 | −11.45 | −10.68 | −11.25 |
| Inequality (1) | 0.51 | 0.53 | 0.52 | 0.51 | 0.51 | 0.52 |
| Inequality (2) | 34.71 | 29.74 | 30.05 | 30.05 | 38.26 | 35.64 |
| Inequality (3) | 0.52 | 0.57 | 0.53 | 0.57 | 0.56 | 0.55 |
| Inequality (4) | 0.09 | 0.08 | 0.11 | 0.10 | 0.13 | 0.09 |
| Inequality (5) | −0.26 | −0.22 | −0.27 | −0.22 | −0.35 | −0.31 |
| Inequality (6) | 0.27 | 0.24 | 0.21 | 0.23 | 0.26 | 0.25 |
| Inequality (7) | 0.90 | 0.80 | 1.03 | 1.28 | 0.76 | 0.85 |
| Inequality (8) | 1.72 | 1.77 | 1.85 | 1.85 | 1.67 | 1.67 |
| Inequality (9) | 40.81 | 40.81 | 40.81 | 46.53 | 42.74 | 42.74 |
| Inequality (10) | 40.81 | 40.81 | 40.81 | 30.00 | 35.04 | 40.81 |
| Inequality (11) | 6.89 | 7.59 | 6.32 | 4.78 | 7.48 | 7.80 |
| Inequality (12) | −0.98 | −1.11 | −0.98 | −0.91 | −1.07 | −0.99 |
| Inequality (13) | −12.56 | −12.53 | −11.98 | −11.45 | −10.68 | −11.25 |

Image Pickup Apparatus

Figure 13:
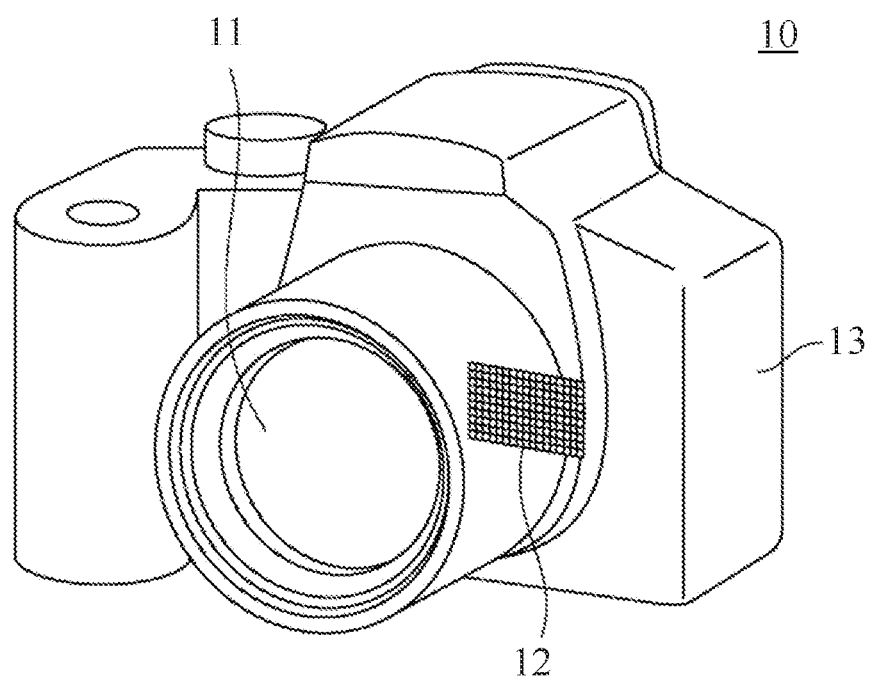
FIG. 13 is a schematic diagram of an image pickup apparatus.

Referring now to FIG. 13, a description will be given of a digital still camera (image pickup apparatus) using the zoom lens L0 according to each example as an imaging optical system. FIG. 13 schematically illustrates an image pickup apparatus (digital camera) 10 according to this example. The image pickup apparatus 10 includes a camera body 13, and a zoom lens 11 according to any one of Examples 1 to 6, and a light receiving element (image sensor) 12 configured to photoelectrically convert an optical image formed by the zoom lens 11.

The image pickup apparatus 10 according to this example includes the zoom lens 11 that is compact and has excellent optical characteristics, and thus can provide high-quality images.

The light receiving element 12 can use an image sensor such as a CCD or CMOS sensor. At this time, by electrically correcting various aberrations such as distortion and chromatic aberration of the image obtained by the light receiving element 12, the image quality of the output image can be improved. The camera body 13 may be a so-called single-lens reflex camera having a quick turn mirror, or a so-called mirrorless camera without a quick turn mirror.

The zoom lens L0 according to each example described above can be applied not only to the digital still camera illustrated in FIG. 13, but also to various optical apparatuses such as a film-based camera, a video camera, and a telescope.

Imaging System

An imaging system (surveillance camera system) may include the zoom lens L0 according to each example and a control unit configured to control the zoom lens L0. The control unit can control the zoom lens L0 so that each lens unit moves as described above during zooming, focusing, and image stabilization. The control unit may not be integrated with the zoom lens L0, and the control unit may be separate from the zoom lens L0. For example, the control unit (control apparatus) provided remotely from a driving unit configured to drive each lens in the zoom lens L0 may include a transmitter configured to transmit a control signal (command) for controlling the zoom lens L0. Such a control unit can remotely control the zoom lens L0.

The control unit may include an operation unit such as a controller and a button for remotely operating the zoom lens L0, and may control the zoom lens L0 according to the input of the user to the operation unit. For example, the operation unit may include an enlargement button and a reduction button. A signal may be sent from the control unit to the driving unit of the zoom lens L0 so that in a case where the user presses the enlarge button, the magnification of the zoom lens L0 increases, and in a case where the user presses the reduce button, the magnification of the zoom lens L0 decreases.

The imaging system may also include a display unit such as a liquid crystal panel configured to display information (moving state) about zoom of the zoom lens L0. The information about the zoom of the zoom lens L0 is, for example, the zoom magnification (zoom state) and the moving amount (moving state) of each lens unit. The user can remotely operate the zoom lens L0 through the operation unit while viewing the information about the zoom of the zoom lens L0 displayed on the display unit. The display unit and the operation unit may be integrated by adopting a touch panel or the like.

Each example can provide a zoom lens that is compact and has good optical characteristics, an image pickup apparatus having the zoom lens, and an imaging system having the zoom lens.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-126694, filed on Aug. 8, 2022, which is hereby incorporated by reference herein in its entirety.

What is claimed is:

1. A zoom lens comprising, in order from an object side to an image side, a first lens unit having negative refractive power, a second lens unit having positive refractive power, and a rear group including one or more lens units,
   wherein distances between adjacent lens units change during zooming,
   wherein the first lens unit includes, in order from the object side to the image side, three or more negative lenses,
   wherein the second lens unit consists of a positive lens configured to move from the object side to the image side during focusing from infinity to a close distance, and
   wherein the following inequalities are satisfied:

$0.48 < D2w/TLw < 0.65$ $25 < vdGP < 45$ where TLw is an overall optical length of the zoom lens at a wide-angle end, D2w is a distance on an optical axis from a lens surface closest to an object of the zoom lens at the wide-angle end to a lens surface closest to the object of the second lens unit, and vdGP is an Abbe number based on d-line of the positive lens.

2. The zoom lens according to claim 1, further comprising an aperture stop disposed on the object side of the second lens unit.

3. The zoom lens according to claim 1, wherein the rear group includes an image stabilizing unit, and wherein the following inequality is satisfied:

$0.35 < DISw/DSPw < 0.80$ where DSPw is a distance on the optical axis from an aperture stop to an image plane at the wide-angle end, and DISw is a distance on the optical axis from the aperture stop at the wide-angle end to a lens surface closest to the object of the image stabilizing unit.

4. The zoom lens according to claim 1, wherein the following inequality is satisfied:

$0.04 < Skw/TLw < 0.25$ where Skw is a back focus of the zoom lens at the wide-angle end, and TLw is an overall optical length of the zoom lens at the wide-angle end.

5. The zoom lens according to claim 1, wherein the following inequality is satisfied:

$-0.45 < fL1/fL2 < -0.15$ where fL1 is a focal length of the first lens unit, and fL2 is a focal length of the second lens unit.

6. The zoom lens according to claim 1, wherein the following inequality is satisfied:

$0.00 < |fL1/fLN| < 0.40$ where fL1 is a focal length of the first lens unit, and fLN is a focal length of a lens unit closest to an image plane in the zoom lens.

7. The zoom lens according to claim 1, wherein the rear group includes an image stabilizing unit, and
   wherein the following inequality is satisfied:

$0.50 < |fLN/fLIS| < 1.60$ where fLN is a focal length of a lens unit disposed closest to an image plane in the zoom lens, and fLIS is an focal length of the image stabilizing unit.

8. The zoom lens according to claim 1, wherein the following inequality is satisfied:

$1.60 < ndGP < 1.91$ where ndGP is a refractive index for the d-line of the positive lens as a focus lens unit.

9. The zoom lens according to claim 1, wherein the rear group includes an image stabilizing unit, and
   wherein the following inequality is satisfied:

$35 < vdGIS < 60$ where vdGIS is an Abbe number for the d-line of a negative lens constituting the image stabilizing unit in the zoom lens.

10. The zoom lens according to claim 1, wherein the following inequality is satisfied:

$22 < vdG1P < 50$ where vdG1P is an Abbe number based on the d-line of a positive lens having strongest refractive power among positive lenses included in the first lens unit.

11. The zoom lens according to claim 1, wherein a negative lens constituting an image stabilizing unit has a meniscus shape with a convex surface facing the object side, and
   wherein the following inequality is satisfied:

$3.5 < (R1+R2)/(R1-R2) < 13.0$ where R1 is a radius of curvature of a lens surface on the object side of the negative lens, and R2 is a radius of curvature of a lens surface on the image side of the negative lens.

12. The zoom lens according to claim 1, wherein the following inequality is satisfied:

$$-1.60 < Ymax\_w/fL1 < -0.40$$

where Ymax_w is a maximum image height in an in-focus state at infinity at the wide-angle end, and fL1 is a focal length of the first lens unit.

13. The zoom lens according to claim 1, wherein the following inequality is satisfied:

$$-20 < Dist\_w < -8.0$$

where Dist_w is a distortion amount at a maximum image height Ymax_w in an in-focus state at infinity of the zoom lens at the wide-angle end.

14. The zoom lens according to claim 1, further comprising a memory configured to store distortion correcting data for correcting distortion.

15. The zoom lens according to claim 1, wherein the first lens unit includes four or more negative lenses and at least one positive lens.

16. The zoom lens according to claim 1, wherein the first lens unit is movable during zooming.

17. The zoom lens according to claim 1, wherein a lens unit closest to an image plane in the zoom lens consists of three or less lenses.

18. The zoom lens according to claim 1, wherein a distance between the first lens unit and the second lens unit is maximum at the wide-angle end among the distances between adjacent lens units in the zoom lens.

19. The zoom lens according to claim 1, wherein the rear group includes two or more lens units.

20. The zoom lens according to claim 1, wherein a lens unit disposed closest to an image plane in the zoom lens is fixed during zooming.

21. The zoom lens according to claim 1, wherein the rear group includes, in order from the object side to the image side, a third lens unit having positive refractive power and a fourth lens unit having positive refractive power.

22. The zoom lens according to claim 1, wherein the rear group includes, in order from the object side to the image side, a third lens unit having positive refractive power, a fourth lens unit having negative refractive power, and a fifth lens unit having positive refractive power.

23. The zoom lens according to claim 1, wherein the rear group includes, in order from the object side to the image side, a third lens unit having negative refractive power, a fourth lens unit having positive refractive power, and a fifth lens unit having negative refractive power.

24. The zoom lens according to claim 1, wherein the rear group includes, in order from the object side to the image side, a third lens unit having negative refractive power, a fourth lens unit having positive refractive power, a fifth lens unit having negative refractive power, and a sixth lens unit having positive refractive power.

25. An image pickup apparatus comprising:
a zoom lens,
an image sensor configured to receive an image formed by the zoom lens,
wherein the zoom lens includes, in order from an object side to an image side, a first lens unit having negative refractive power, a second lens unit having positive refractive power, and a rear group including one or more lens units,
wherein distances between adjacent lens units change during zooming,
wherein the first lens unit includes, in order from the object side to the image side, three or more negative lenses,
wherein the second lens unit consists of a positive lens configured to move from the object side to the image side during focusing from infinity to a close distance, and
wherein the following inequalities are satisfied:

$$0.48 < D2w/TLw < 0.65$$

$$25 < vdGP < 45$$

where TLw is an overall optical length of the zoom lens at a wide-angle end, D2w is a distance on an optical axis from a lens surface closest to an object of the zoom lens at the wide-angle end to a lens surface closest to the object of the second lens unit, and vdGP is an Abbe number based on d-line of the positive lens.

26. The image pickup apparatus according to claim 25, wherein an effective image circle diameter at the wide-angle end is smaller than an effective image circle diameter at a telephoto end.

\* \* \* \* \*